United States Patent
Tucker et al.

(10) Patent No.: US 10,748,422 B2
(45) Date of Patent: Aug. 18, 2020

(54) METHOD FOR LOCATING A VEHICLE

(71) Applicant: Apple Inc., Cupertino, CA (US)

(72) Inventors: Brian J. Tucker, San Jose, CA (US);
Emily C. Schubert, San Jose, CA (US); Jesse L. Dorogusker, Palo Alto, CA (US); Joakim Linde, Palo Alto, CA (US); Stephen Chick, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/200,506

(22) Filed: Nov. 26, 2018

(65) Prior Publication Data

US 2019/0096252 A1 Mar. 28, 2019

Related U.S. Application Data

(60) Division of application No. 15/376,630, filed on Dec. 12, 2016, now Pat. No. 10,140,863, which is a division of application No. 14/718,905, filed on May 21, 2015, now Pat. No. 9,520,062, which is a continuation of application No. 13/278,035, filed on Oct. 20, 2011, now Pat. No. 9,041,556.

(51) Int. Cl.
| | | |
|---|---|---|
| *G01C 21/00* | (2006.01) | |
| *G08G 1/127* | (2006.01) | |
| *G01S 5/02* | (2010.01) | |
| *G01C 21/20* | (2006.01) | |
| *H04W 4/02* | (2018.01) | |
| *H04W 4/80* | (2018.01) | |

(52) U.S. Cl.
CPC .............. *G08G 1/127* (2013.01); *G01C 21/20* (2013.01); *G01C 21/206* (2013.01); *G01S 5/0205* (2013.01); *H04W 4/025* (2013.01); *H04W 4/80* (2018.02)

(58) Field of Classification Search
USPC ....................................................... 340/932.2
See application file for complete search history.

(56) References Cited

U.S. PATENT DOCUMENTS

| | | | |
|---|---|---|---|
| 6,405,125 B1 | 6/2002 | Ayed | |
| 6,526,335 B1 | 2/2003 | Treyz | |
| 6,650,999 B1 | 11/2003 | Brust et al. | |
| 6,909,964 B2 | 6/2005 | Armstrong | |
| 7,688,226 B2 | 3/2010 | McCall | |
| 8,416,064 B2 | 4/2013 | Leung | |
| 9,041,556 B2 | 5/2015 | Tucker et al. | |

(Continued)

OTHER PUBLICATIONS

U.S. Appl. No. 14/718,905, filed May 21, 2015, Brian J. Tucker et al.

(Continued)

*Primary Examiner* — Brent Swarthout
(74) *Attorney, Agent, or Firm* — Robert C. Kowert; Kowert, Hood, Munyon, Rankin & Goetzel, P.C.

(57) ABSTRACT

A portable computing device can be used to locate a vehicle in a parking structure. In particular, the portable computing device can communicate with a parking system that manages the parking structure and/or with a vehicle in order to locate the vehicle. Communications between the portable computing device, parking system and vehicle can be based on one or more wireless connections, such as Bluetooth and/or Bluetooth LE connections.

20 Claims, 12 Drawing Sheets

(56) References Cited

U.S. PATENT DOCUMENTS

| | | |
|---|---|---|
| 9,520,062 B2 | 12/2016 | Tucker et al. |
| 2005/0057373 A1 | 3/2005 | Noguchi |
| 2005/0270178 A1* | 12/2005 | Ioli ............... G06Q 20/40 |
| | | 340/932.2 |
| 2006/0267799 A1 | 11/2006 | Mendelson |
| 2008/0167806 A1* | 7/2008 | Wheeler ............ G01C 21/26 |
| | | 701/532 |
| 2009/0026254 A1 | 1/2009 | Johnson et al. |
| 2009/0276236 A1 | 11/2009 | Adamczyk et al. |
| 2010/0085214 A1 | 4/2010 | Kim |
| 2010/0161209 A1* | 6/2010 | Vaghefinazari .... G01C 21/3632 |
| | | 701/533 |
| 2011/0054731 A1 | 3/2011 | DeRose et al. |
| 2011/0238291 A1* | 9/2011 | Bach ............... G01C 21/32 |
| | | 701/533 |
| 2012/0213176 A1 | 8/2012 | Kwak et al. |

OTHER PUBLICATIONS

U.S. Appl. No. 13/278,038, filed Oct. 20, 2011, Brian J. Tucker et al.

\* cited by examiner

METHOD FOR LOCATING A VEHICLE

This application is a divisional of U.S. patent application Ser. No. 15/376,630, filed Dec. 12, 2016, now U.S. Pat. No. 10,140,863, which is a divisional of Ser. No. 14/718,905, filed May 21, 2015, now U.S. Pat. No. 9,520,062, which is a continuation of U.S. patent application Ser. No. 13/278,035, filed Oct. 20, 2011, now U.S. Pat. No. 9,041,556, which are hereby incorporated by reference herein in their entirety.

The present disclosure relates generally to wireless communication between computing devices and more particularly to using portable computing devices to locate a vehicle.

Computing devices have been in use for several decades. Examples of computing devices include, for example, desktop computers, laptop computers, mobile phones, smartphones, tablet devices, portable multimedia players, devices integrated into automobiles, and/or the like. Computing devices can be used for performing a wide variety of tasks, from the simple to the most complex. In some instances, computing devices can have weight and size characteristics such that the devices are portable or easily moved.

Many computing devices currently incorporate interfaces that support various wireless communication standards. For example, many interfaces currently support communications based on the Bluetooth protocol. The Bluetooth protocol, in general, enables point-to-point wireless communications between multiple devices over short distances (e.g., 200 meters). Bluetooth has gained widespread popularity since its introduction and is currently used in a range of different devices.

In order to allow Bluetooth to be used in a greater variety of applications, a low energy variant of the technology was introduced in the Bluetooth Core Specification, Version 4.0. Bluetooth Low Energy (LE), in general, enables devices to wirelessly communicate while drawing low amounts of power. For example, devices using Bluetooth LE can often operate for more than a year without requiring their batteries to be recharged.

SUMMARY

According to various embodiments of the present invention, a portable computing device can be used to locate a vehicle in a parking structure. In particular, the portable computing device can communicate with a parking system that manages the parking structure and/or with a vehicle in order to locate the vehicle. In certain embodiments, communications between the portable computing device, parking system and vehicle can be based on one or more wireless connections, such as Bluetooth and/or Bluetooth LE connections.

In one embodiment, a portable computing device can, while in a parking structure, determine whether a vehicle associated with the portable computing device is currently in a parked state. If the vehicle is currently parked, the portable computing device can request and receive location information from a first set of one or more wireless sensors situated within the parking structure. Based on the received information, the portable computing device can determine a parking location for the vehicle. Thereafter, the portable computing device can be moved away from the parking structure, and subsequently returned. Upon returning to the parking structure, the portable computing device can request and receive location information from a second set of one or more wireless sensors of the parking structure. The second set of wireless sensors can be situated in an area within the parking structure that is different from the area where first set is situated. Based on the received information, the portable computing device can determine its current location. Thereafter, the portable computing device can use its current location and the previously determined parking location for the vehicle to generate guidance information. The guidance information can be presented to a user in order to direct the user to the vehicle.

In another embodiment, a vehicle can, while in a parking structure, determine whether it is currently in a parked state. If it is currently parked, the vehicle can transmit identification information to a first set of one or more wireless sensors situated within the parking structure. A parking system that manages the parking structure can receive the identification information and determine a parking location for the vehicle. The parking system can thereafter store the identification information and determined parking location for the vehicle as, for example, a record in a database. At a later time, a portable computing device associated with the vehicle can transmit the same identification information to a second set of one or more wireless sensors situated within the parking structure. The second set of wireless sensors can be situated in an area that is different from the area where the first set is situated. The parking system can receive the identification information and determine a current location for the portable computing device. The parking system can additionally search for a match to the received identification information in the aforementioned database. If a matching record is located, the parking system can generate guidance information based on the current location of the portable computing device and the vehicle parking location listed in the matching database record. The guidance information can thereafter be transmitted to the portable computing device, which can present the information to a user of the portable computing device.

In some embodiments, other information can be provided in addition to or instead of guidance information. For example, information regarding payment can be provided, such as rates to be charged for parking, where and how to pay, and/or how much is owed depending on the particular parking location and duration of parking.

These and other embodiments of the invention along with many of its advantages and features are described in more detail in conjunction with the text below and attached figures.

DETAILED DESCRIPTION

Figure 1:
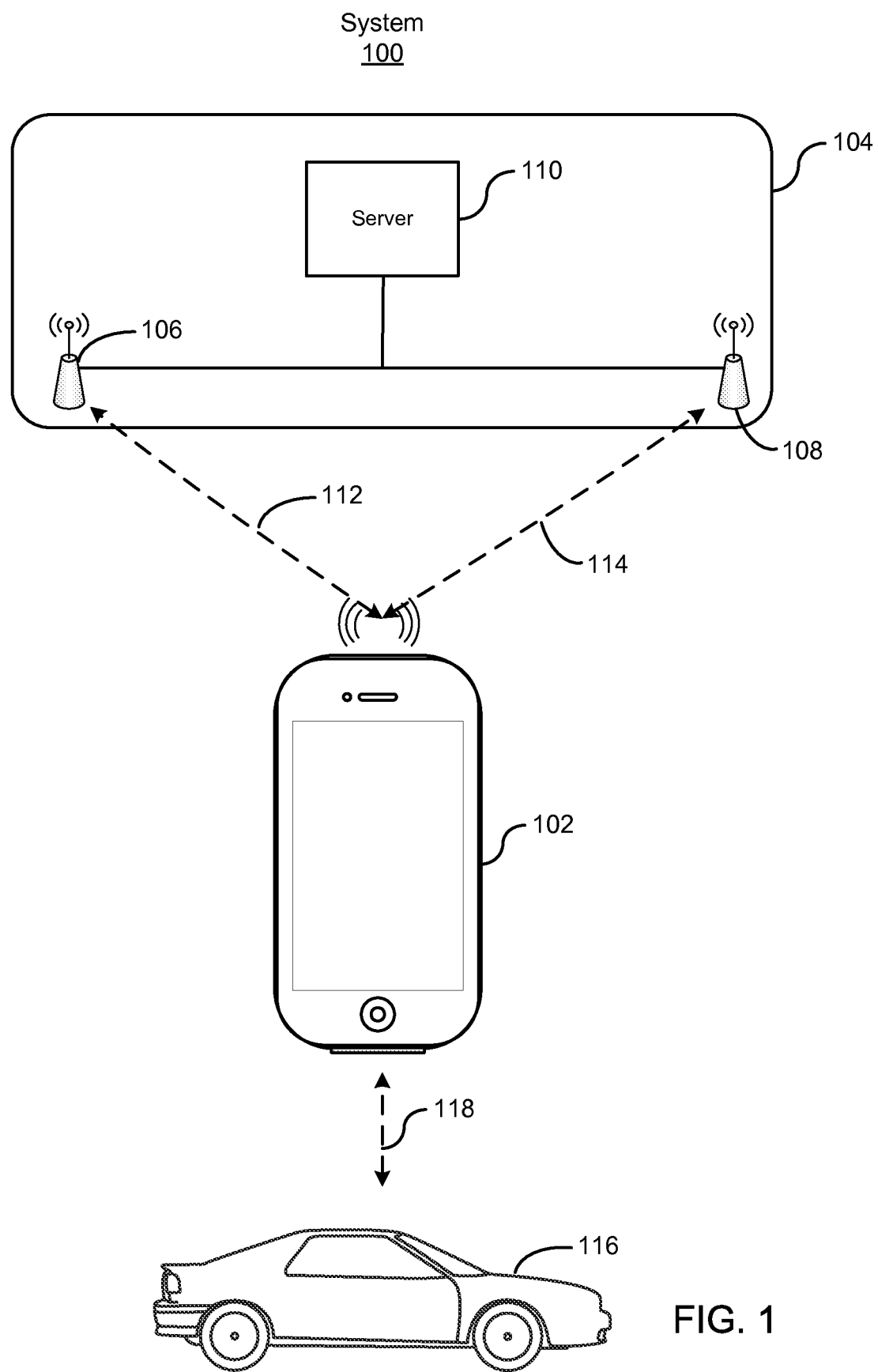
FIG. 1. illustrates a system including a portable computing device, a parking system, and a vehicle according to an embodiment of the present invention.

According to various embodiments of the present invention, a portable computing device can be used to locate a vehicle in a parking structure. In particular, the portable computing device can communicate with a parking system that manages the parking structure and/or with a vehicle in order to locate the vehicle. In certain embodiments, communications between the portable computing device, parking system and vehicle can be based on one or more wireless connections, such as Bluetooth and/or Bluetooth LE connections.

In one embodiment, a portable computing device can, while in a parking structure, determine whether a vehicle associated with the portable computing device is currently in a parked state. If the vehicle is currently parked, the portable computing device can request and receive location information from a first set of one or more wireless sensors situated within the parking structure. (The term "sensor" is used herein to refer generally to a device that is capable of receiving and/or transmitting data wirelessly.) The location information can include positioning information (e.g., coordinates), a parking stall number, a parking structure floor number, a wireless sensor identifier, and/or the like. Based on the received information, the portable computing device can determine a parking location for the vehicle. Thereafter, the portable computing device can be moved away from the parking structure, and subsequently returned. Upon returning to the parking structure, the portable computing device can request and receive location information from a second set of one or more wireless sensors of the parking structure. The second set of one or more wireless sensors can be located in an area of the parking structure that is different from the area where the first set is located. Based on the received information, the portable computing device can determine its current location. Thereafter, the portable computing device can use its current location and the previously determined parking location for the vehicle to generate guidance information. The guidance information can be presented to a user, for example, via a touch screen in order to direct the user to the vehicle.

In another embodiment, a vehicle can, while in a parking structure, determine whether it is currently in a parked state. If it is currently parked, the vehicle can transmit identification information (e.g., identifiers, device addresses, unique codes, etc.) to a first set of one or more wireless sensors situated within the parking structure. A parking system that manages the parking structure can receive the identification information and determine a parking location for the vehicle. The parking system can thereafter store the identification information and determined parking location for the vehicle as, for example, a record in a database. At a later time, a portable computing device associated with the vehicle can transmit the same identification information to a second set of one or more wireless sensors situated within the parking structure. The second set of wireless sensors can be located in an area of the parking structure that is different from the area where the first set of wireless sensors is located. The parking system can receive the identification information from the portable computing device and determine a location for the portable computing device. The parking system can additionally search for a match to the received identification information in the aforementioned database. If a matching record is located, the parking system can generate guidance information based on the location of the portable computing device and the vehicle location listed in the matching database record. The guidance information can thereafter be transmitted to the portable computing device, which can present the information to a user, for example, via a touch screen in order to direct the user to the vehicle. In some embodiments, other information can be provided in addition to or instead of guidance information. For example, information regarding payment can be provided, such as rates to be charged for parking, where and how to pay, and/or how much is owed depending on the particular parking location and duration of parking.

Various entities (e.g., portable computing devices, vehicles, parking systems, etc.) described herein can communicate over one or more wireless connections. Currently, many wireless communication standards exist for enabling different devices to communicate. One popular wireless communication standard is Bluetooth. In general, Bluetooth allows voice and data communication between various devices without a physical cable, and instead uses frequency-hopping spread spectrum technology. Currently, Bluetooth exists in two variations: standard Bluetooth (e.g., Bluetooth Basic Rate/Enhanced Data Rate) and Bluetooth Low Energy (LE).

As a general matter, Bluetooth LE operates similarly to standard Bluetooth, except that those interfaces using Bluetooth LE consume less power and operate with lower latency. Bluetooth LE, in addition, uses a different a set of channels from standard Bluetooth. In particular, Bluetooth LE operates over 40 two-MHz-wide channels rather than the 79 one-MHz-wide channels used in standard Bluetooth. While Bluetooth and Bluetooth LE are not designed to be compatible with one another, many Bluetooth interfaces support both variations (e.g., the modules can operate in dual mode).

At the most basic level, devices supporting Bluetooth and/or Bluetooth LE can establish wireless connections with neighboring Bluetooth and/or Bluetooth LE devices using point-to-point connections. In particular, a master-slave structure can be established where one master device communicates with at least one slave device in a network group called a piconet.

Typically, in order for two Bluetooth devices to establish a connection, the devices must be paired through a connection procedure. The connection procedure is frequently triggered automatically the first time a device receives a connection request from a device with which it is not yet paired. Initial pairing may require user intervention, e.g., to confirm that pairing is desired or to enter an authentication code. After a pairing has been established, parameters associated with the pairing can be remembered (e.g., stored) by the devices and a secure connection can be established. Following pairing, the paired devices can reconnect to each other without user intervention. If desired, the pairing relationship can later be removed by a user.

In some instances, communication between two Bluetooth devices might not require a pairing. In particular, the Bluetooth protocol enables a limited amount of information to be communicated without a pairing between two devices being established.

The following description primarily refers to communication using Bluetooth and/or Bluetooth LE connections. However, one skilled in the art will appreciate that the techniques disclosed in this specification are equally applicable to other types of connections, such as wired and other types of wireless connections (e.g., near field communications, WiFi, or the like).

FIG. 1 illustrates a system 100 including a portable computing device 102, a parking system 104, and a vehicle 116. Each of portable computing device 102, parking system 104, and vehicle 116 can include one or more wireless communication interfaces, such as Bluetooth modules, and various other components, examples of which are described in detail below.

Portable computing device 102 can be any portable computing device with a wireless interface, such as a laptop computer, a tablet device, a key fob, a car key, an access card, a multi-function device, a mobile phone, a portable gaming device, a portable multimedia player, a portable music player, a personal digital assistant (PDA), a household device, and/or any portable or non-portable electronic or electro-mechanical device and/or the like. For example, portable computing device 102 can each be an iPod®, iPhone®, or iPad® device available from Apple Inc. of Cupertino, Calif.

Parking system 104 can be any system suitable for managing a parking structure. Such a system can include any suitable hardware and/or software equipment and/or components (e.g., computer servers, clusters of computer servers, communications systems, operating systems, elevators, payment stations, etc.). For example, parking system 104 can include a central server for managing the operations of a parking structure (e.g., server 110) and one or more wireless interfaces (e.g., sensors 106 and 108) to communicate with portable computing devices and/or vehicles. Parking system 104 can additionally include systems for tracking the location of parked vehicles, operating elevators, operating payment stations, and/or the like.

Vehicle 116 can be any suitable transportation machinery, such as an automobile, a truck, a bus, a tractor, a golf cart, a go-kart, a motorcycle, a scooter, a bicycle, a motorized bicycle, a boat, a watercraft (e.g., a jet-ski), an aircraft, a lawn mower, a snowmobile, and/or the like. A "parking location" can be any place where a vehicle can be parked, stored, or docked. For example, in the case of a boat, a parking location can refer to a berth in a marina; in the case of an aircraft, a parking location can refer to a location at a municipal airport (e.g., outdoors or in a hangar).

As shown in FIG. 1, portable computing device 102 and parking system 104 can communicate via wireless connections 112 and 114. In particular, portable computing device 102 can establish connection 112 with wireless sensor 106 of parking system 104. Portable computing device 102 can additionally establish connection 114 with wireless sensor 108 of parking system 104. Each of the wireless connections 112 and 114 can be a suitable wireless connection type, such as a Bluetooth LE or Bluetooth connection. In some embodiments, portable computing device 102 and parking system 104 can exchange various information over the aforementioned wireless connections in order to enable the portable computing device to locate a vehicle with which the portable computing device is associated.

As further shown in FIG. 1, portable computing device 102 and vehicle 116 can communicate via wireless connection 118. Wireless connection 118 can be a suitable wireless connection type, such as a Bluetooth LE or Bluetooth connection. In some embodiments, portable computing device 102 and vehicle 116 can exchange various information over the aforementioned wireless connection, such as vehicle operating state information, data communications, voice communications, etc.

Figure 2:
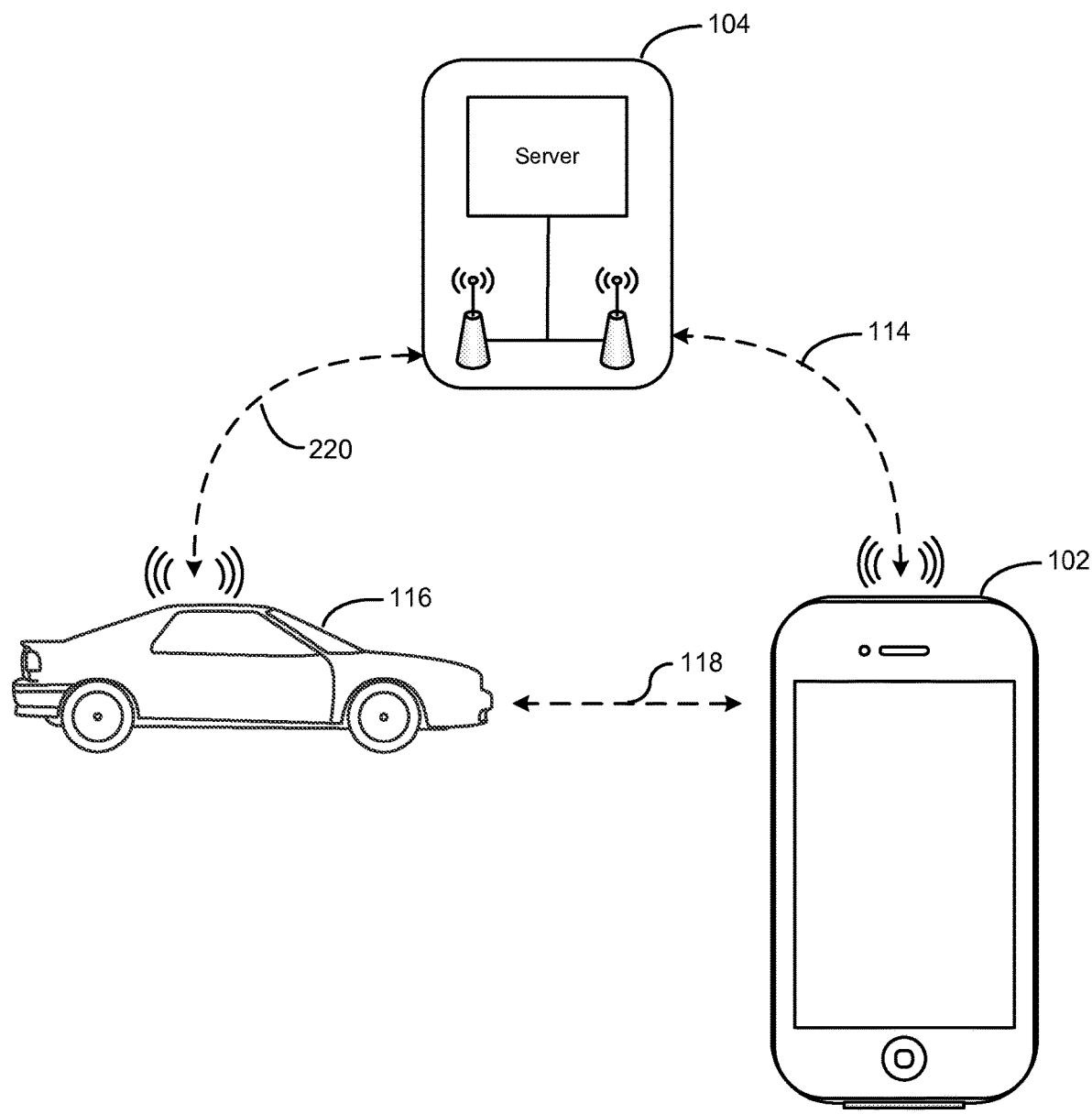
FIG. 2 illustrates a system including a portable computing device, a parking system, and a vehicle according to another embodiment of the present invention.

FIG. 2 illustrates system 200 including a portable computing device 102, a parking system 104, and a vehicle 116. System 200 can be similar to system 100 shown in FIG. 1 except that parking system 104 can communicate with vehicle 116 over wireless connection 220. Wireless connection 220 can be a suitable wireless connection type, such as a Bluetooth LE or Bluetooth connection.

It should be appreciated that the wireless connections shown in FIGS. 1 and 2 can be, but need not be, concurrent. Illustratively, connection 112 of system 100 can be established at a first time. The connection can thereafter be terminated. For example, portable computing device 102 might be moved out of range of wireless sensor 106. At a later time, connection 114 of system 100 can be established.

It will be further appreciated that the devices shown in FIGS. 1 and 2 are illustrative and that variations and modifications are possible. For example, although the systems of FIGS. 1 and 2 only show one portable computing device, one parking system, and one vehicle, any suitable number of these entities (including zero) can be included. Illustratively, system 100 can include two portable computing devices that can communicate with parking system 104 over wireless connections.

Figure 3:
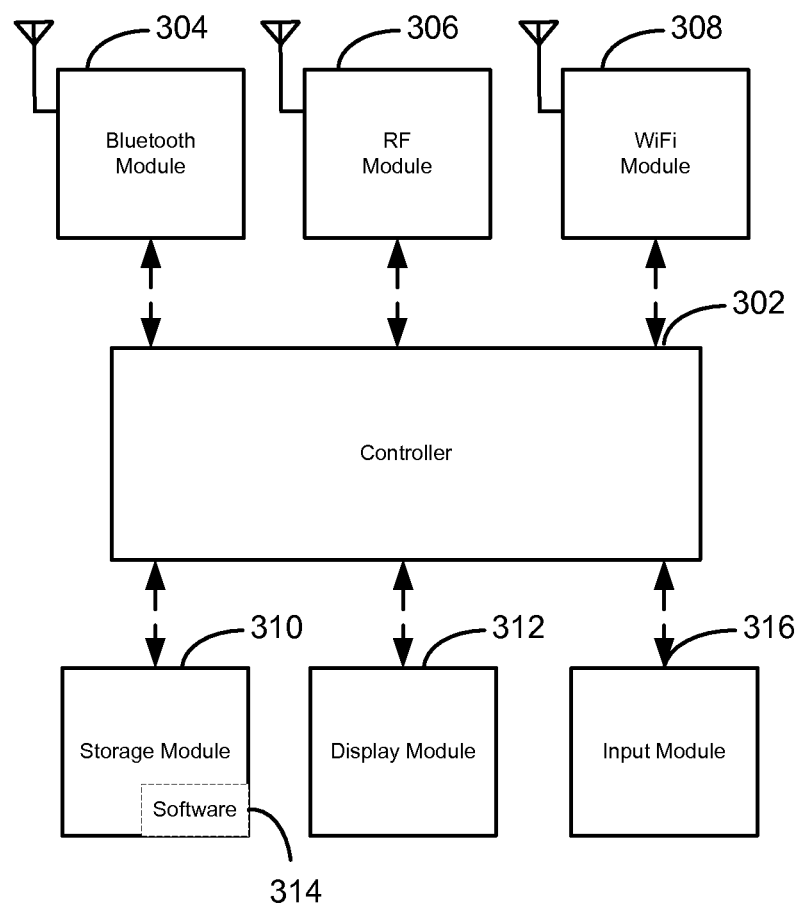
FIG. 3 illustrates an exemplary portable computing device according to an embodiment of the present invention.

FIG. 3 is a block diagram showing an exemplary portable computing device (e.g., portable computing device 102 shown in FIGS. 1 and 2) according to an embodiment. Portable computing device 300 can include a controller 302, a Bluetooth module 304, an RF module 306, a WiFi module 308, a storage module 310, a display module 312, and an input module 316. In some embodiments, portable computing device 300 can include additional modules, such as global positioning system (GPS) modules, battery modules, motion detection modules, device orientation modules, magnetometer modules, three-dimensional gyroscope modules, connector modules, audio modules, three-dimensional video processing modules, acceleration detection modules, camera modules, and/or the like. In some embodiments, portable computing device 300 can be a sufficient size, dimension, and weight to enable the device to be easily moved by a user. For example, portable computing device 300 can be pocket size.

Controller 302, which can be implemented as one or more integrated circuits, can control and manage the overall operation of portable computing device 300. For example, controller 302 can perform various tasks, such as retrieving various assets that can be stored in storage module 310, accessing the functionalities of various modules (e.g., interacting with other Bluetooth enabled devices via Bluetooth module 304), executing various software programs (e.g., operating systems and applications) residing on storage module 310, receiving location information, generating guidance instructions, and so on. In some embodiments, controller 302 can include one or more processors (e.g., microprocessors or microcontrollers) configured to execute machine-readable instructions. For example, controller 302 can include a single chip applications processor. Controller 302 can further be connected to storage module 310 in any suitable manner.

Bluetooth module 304 can include any suitable combinations of hardware for performing wireless communications with other Bluetooth enabled devices and allows an RF signal to be exchanged between controller 302 and other Bluetooth enabled devices. In some embodiments, Bluetooth module 304 can perform such wireless communications according to Bluetooth Basic Rate/Enhanced Data Rate (BR/EDR) and/or Bluetooth Low Energy (LE) standards. For example, Bluetooth module 304 can include suitable hardware for performing device discovery, connection establishment, and communication based on only Bluetooth LE (e.g., single mode operation). As another example, Bluetooth module 304 can include suitable hardware for device discovery, connection establishment, and communication based on both Bluetooth BR/EDR and Bluetooth LE (e.g., dual mode operation). As still another example, Bluetooth module 304 can include suitable hardware for device discovery, connection establishment, and communication based only on Bluetooth BR/EDR.

RF module 306 can include any suitable combinations of hardware for performing wireless communications with wireless voice and/or data networks. For example, RF module 306 can include a RF transceiver (e.g., using mobile telephone technology such as GSM or CDMA, advanced data network technology such as 3G or EDGE) that enables a user of portable computing device 300 to place telephone calls over a wireless voice network.

WiFi module 308 can include any suitable combinations of hardware for performing WiFi (e.g., IEEE 802.11 family standards) based communications with other WiFi enabled devices.

Storage module 310 can be implemented, e.g., using disk, flash memory, random access memory (RAM), hybrid types of memory, optical disc drives or any other storage medium that can store program code and/or data. Storage module 310 can store software programs 314 that are executable by controller 302, including operating systems, applications, and related program code. In some embodiments, storage module 310 can additionally store identification information, etc.

Software programs 314 (also referred to as software or apps herein) can include any program executable by controller 302. In some embodiments, certain software programs can be installed on portable computing device 300 by its manufacturer, while other software programs can be installed by a user. Examples of software programs 314 can include operating systems, applications for locating vehicles, productivity applications, video game applications, personal information management applications, applications for playing media assets and/or navigating a media asset database, applications for controlling a telephone interface to place and/or receive calls, and so on. For example, software programs 314 can include an application that enables a user of portable computing device 300 to locate a vehicle. Certain software programs 314 can provide communication with and/or control of portable computing devices, and certain software programs 314 can be responsive to control signals or other input from portable computing device 300.

Display module 312 can be implemented as a CRT display, an LCD display (e.g., touch screen), a plasma display, a direct-projection or rear-projection DLP, a micro-display, and/or the like. In various embodiments, display module 312 can be used to visually display user interfaces, images, and/or the like.

Input module 316 can be implemented as a touch screen (e.g., LCD based touch screen), a voice command system, a keyboard, a computer mouse, a trackball, a wireless remote, a button, and/or the like. Input module 316 can allow a user to provide inputs to invoke the functionality of controller 302. In some embodiments, input module 316 and display module 312 can be combined or integrated. For example, portable computing device 300 can include an LCD-based touch screen that displays images and also captures user input. Illustratively, a user can tap his or her finger on a region of the touch screen's surface that displays an icon. The touch screen can capture the tap and, in response, start a software program associated with the icon. Upon starting the software program, a graphical user interface for the application can be displayed on the touch screen for presentation to the user.

Figure 4:
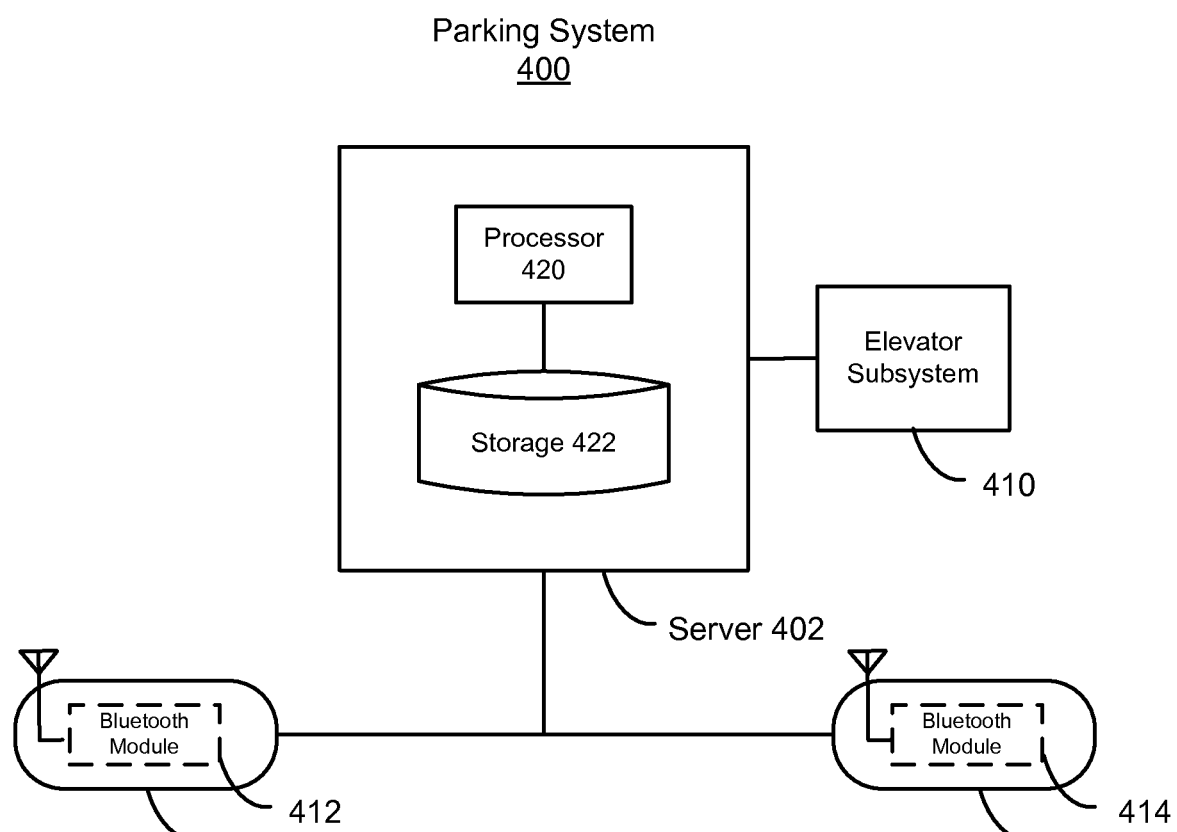
FIG. 4 illustrates an exemplary parking system according to an embodiment of the present invention.

FIG. 4 is a diagram showing an exemplary parking system (e.g., parking system 104 shown in FIGS. 1 and 2) according to an embodiment. As shown in FIG. 4, parking system 400 can include a server 402, wireless sensor 404, wireless sensor 406, and elevator subsystem 408. In some embodiments, parking system 400 can include other subsystems, such as a payment subsystem, an entertainment subsystem, and/or the like.

Server 402 can be a computer or cluster of computers functioning to manage at least a part of the operations of parking system 400. In some embodiments, server 402, can include one or more processors 420, each of which can be configured to execute machine-readable instructions. Server 402 can further include a machine-readable storage medium 422 for storing program code, instructions, and/or other data. For example, server 402 can store identification information and vehicle locations in a parking locator database stored on the machine-readable storage medium. In certain embodiments, server 402 can provide guidance instructions to a portable computing device, e.g., by communicating with the portable device via wireless sensors 404 and/or 406. Server 402 can additionally operate elevator subsystem 408 to help guide a user toward a vehicle. Illustratively, portable computing device 102 might be located on the first floor of a parking structure managed by parking system 400. A vehicle associated with portable computing device 102, however, might be parked on the third floor of the parking structure. Server 402 can operate elevator subsystem 408 such that an elevator of the subsystem is moved to the first floor. After portable computing device 102 and/or the user of portable computing device 102 have entered the elevator, server 402 can instruct the elevator to move to the third floor of the parking structure.

Wireless sensors 404 and 406 can each be devices capable of communicating with other wireless devices. In some embodiments, wireless sensors 404 and 406 can be configured to transmit information received from the wireless devices to, for example, server 402 for processing. Wireless sensors 404 and 406 can additionally be configured to transmit information received from server 402 to any connected wireless devices.

As shown in FIG. 4, wireless sensors 404 and 406 can include Bluetooth modules 412 and 414. Each of Bluetooth modules 412 and 414 can include any suitable combinations of hardware for performing wireless communications with other Bluetooth enabled devices. In some embodiments, each Bluetooth module can perform such wireless communications according to Bluetooth Basic Rate/Enhanced Data Rate (BR/EDR) and/or Bluetooth Low Energy (LE) standards. For example, each Bluetooth module can include suitable hardware for performing device discovery, connection establishment, and communication based on only Bluetooth LE (e.g., single mode operation). As another example, each Bluetooth module can include suitable hardware for device discovery, connection establishment, and communication based on both Bluetooth BR/EDR and Bluetooth LE (e.g., dual mode operation). As still another example, each Bluetooth module can include suitable hardware for device discovery, connection establishment, and communication based only on Bluetooth BR/EDR.

Parking system 400 can include any number of wireless sensors. Furthermore, the wireless sensors can be situated in any suitable part of a parking structure managed by parking system 400. For example, parking system 400 can situate wireless sensors in each parking stall within a parking structure. As another example, parking system 400 can situate wireless sensors in each row within a parking structure. Information gathered from and/or transmitted by the wireless sensors can be used to determine the relative location of a vehicle and/or a portable computing device associated with the vehicle.

Elevator subsystem 408 can include any suitable equipment, hardware, software, and/or the like for operating one or more elevators installed within a parking structure. In some embodiments, elevator subsystem 408 can receive commands from server 402. Illustratively, server 402 can instruct elevator subsystem 408 to move an elevator to a specific floor or location.

Figure 5:
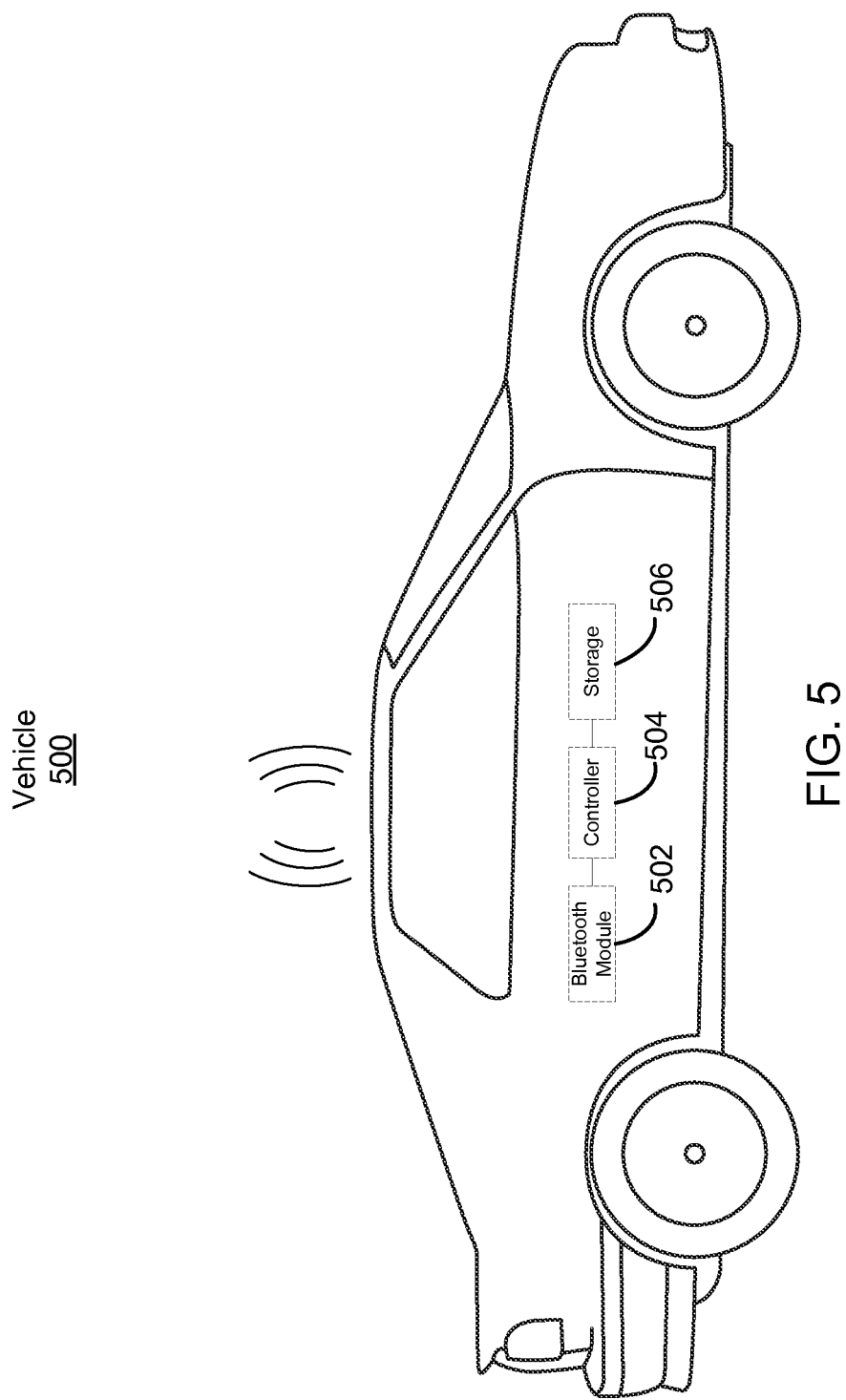
FIG. 5 illustrates an exemplary vehicle according to an embodiment of the present invention.

FIG. 5 is a diagram showing an exemplary vehicle (e.g., vehicle 116 of FIG. 2) according to an embodiment. As shown in FIG. 5, vehicle 500 can include Bluetooth module 502, controller 504, and storage module 506.

Bluetooth module 502 can include any suitable combinations of hardware for performing wireless communications with other Bluetooth enabled devices and allows an RF signal to be exchanged between controller 504 and other Bluetooth enabled devices. In some embodiments, Bluetooth module 502 can perform such wireless communications according to Bluetooth Basic Rate/Enhanced Data Rate (BR/EDR) and/or Bluetooth Low Energy (LE) standards. For example, Bluetooth module 502 can include suitable hardware for performing device discovery, connection establishment, and communication based on only Bluetooth LE (e.g., single mode operation). As another example, Bluetooth module 502 can include suitable hardware for device discovery, connection establishment, and communication based on both Bluetooth BR/EDR and Bluetooth LE (e.g., dual mode operation). As still another example, Bluetooth module 502 can include suitable hardware for device discovery, connection establishment, and communication based only on Bluetooth BR/EDR.

Controller 504, which can be implemented as one or more integrated circuits, can control and manages certain operations of vehicle 500. For example, controller 504 can perform various tasks, such as accessing the functionalities of various modules (e.g., interacting with other Bluetooth enabled devices via Bluetooth module 502), executing various software programs residing on storage module 506, transmitting identification information, transmitting vehicle state information, and so on. In some embodiments, controller 504 can include one or more processors (e.g., microprocessors or microcontrollers) configured to execute machine-readable instructions. Controller 504 can further be connected to storage module 506 in any suitable manner.

Storage module 506 can be implemented, e.g., using disk, flash memory, random access memory (RAM), hybrid types of memory, optical disc drives or any other storage medium that can store program code and/or data. Storage module 506 can store program code that is executable by controller 504.

Figure 6:
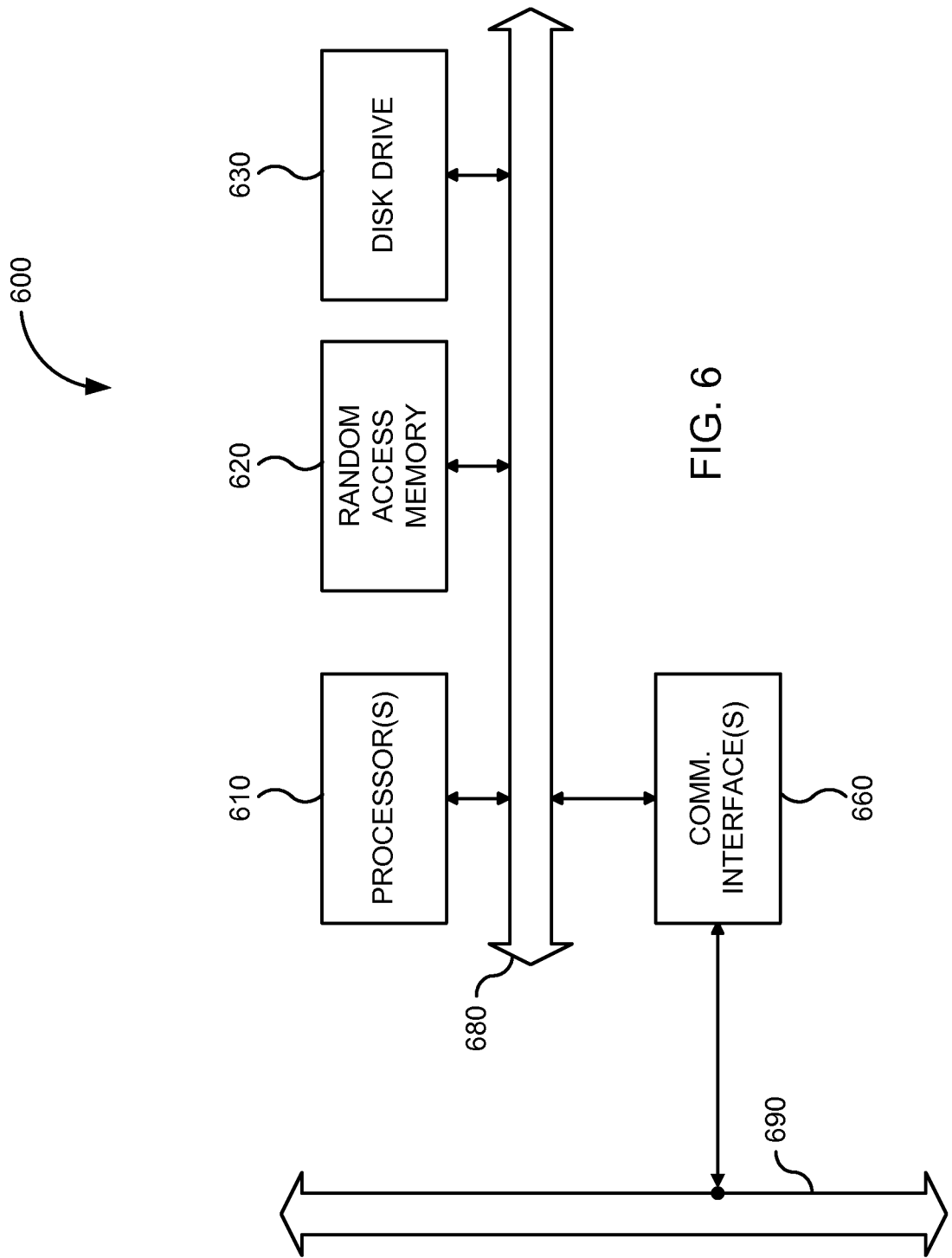
FIG. 6 illustrates an exemplary computer system that can be used according to an embodiment of the present invention.

FIG. 6 is a simplified block diagram of a computer system 600 that can be used in embodiments of the present invention. For example, various subsystems (e.g., server 402 or elevator subsystem 408) of parking system 400 can incorporate computer system 600. FIG. 6 is merely illustrative of an embodiment incorporating the present invention and does not limit the scope of the invention as recited in the claims. One of ordinary skill in the art would recognize other variations, modifications, and alternatives.

In one embodiment, computer system 600 includes processor(s) 610, random access memory (RAM) 620, disk drive 630, communications interface(s) 660, and a system bus 680 interconnecting the above components. Other components can also be present.

RAM 620 and disk drive 630 are examples of tangible media configured to store data such as audio, image, and movie files, operating system code, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

Embodiments of communications interface 660 can include computer interfaces, such as include an Ethernet card, wireless interface (e.g., Bluetooth, WiFi, etc.), a modem (telephone, satellite, cable, ISDN), (asynchronous) digital subscriber line (DSL) unit, FireWire interface, USB interface, and the like. For example, communications interface 660 can include interfaces to connect to a wireless network 690, and for transmitting and receiving data based over the network.

In various embodiments, computer system 600 can also include software that enables communications over a network such as the HTTP, TCP/IP, RTP/RTSP protocols, and the like. In alternative embodiments of the present invention, other communications software and transfer protocols may also be used, for example IPX, UDP or the like.

In various embodiments, computer system 600 may also include an operating system, such as OS X®, Microsoft Windows®, Linux®, real-time operating systems (RTOSs), embedded operating systems, open source operating systems, and proprietary operating systems, and the like. System 600 can also have other components e.g., user interface with keyboard, buttons, monitors, indicators, and the like.

Examples of processes that can be used for locating a vehicle using a portable computing device will now be described.

Various embodiments described herein can be related to at least two different classes of embodiments. In a first class of embodiments, a portable computing device can interpret sensor data and determine a parking location for a vehicle. The portable computing device can additionally determine its current position, generate guidance instructions for a user, and generate commands to a parking system to operate a parking subsystem (e.g., an elevator). In a different class of embodiments, a server of a parking system that manages a parking structure can interpret sensor data received from one or more sensors, determine a parking location for a vehicle, determine a current location for a portable computing device, transmit guidance instructions to the portable computing device, and operate a parking subsystem (e.g., an elevator).

Figure 7:
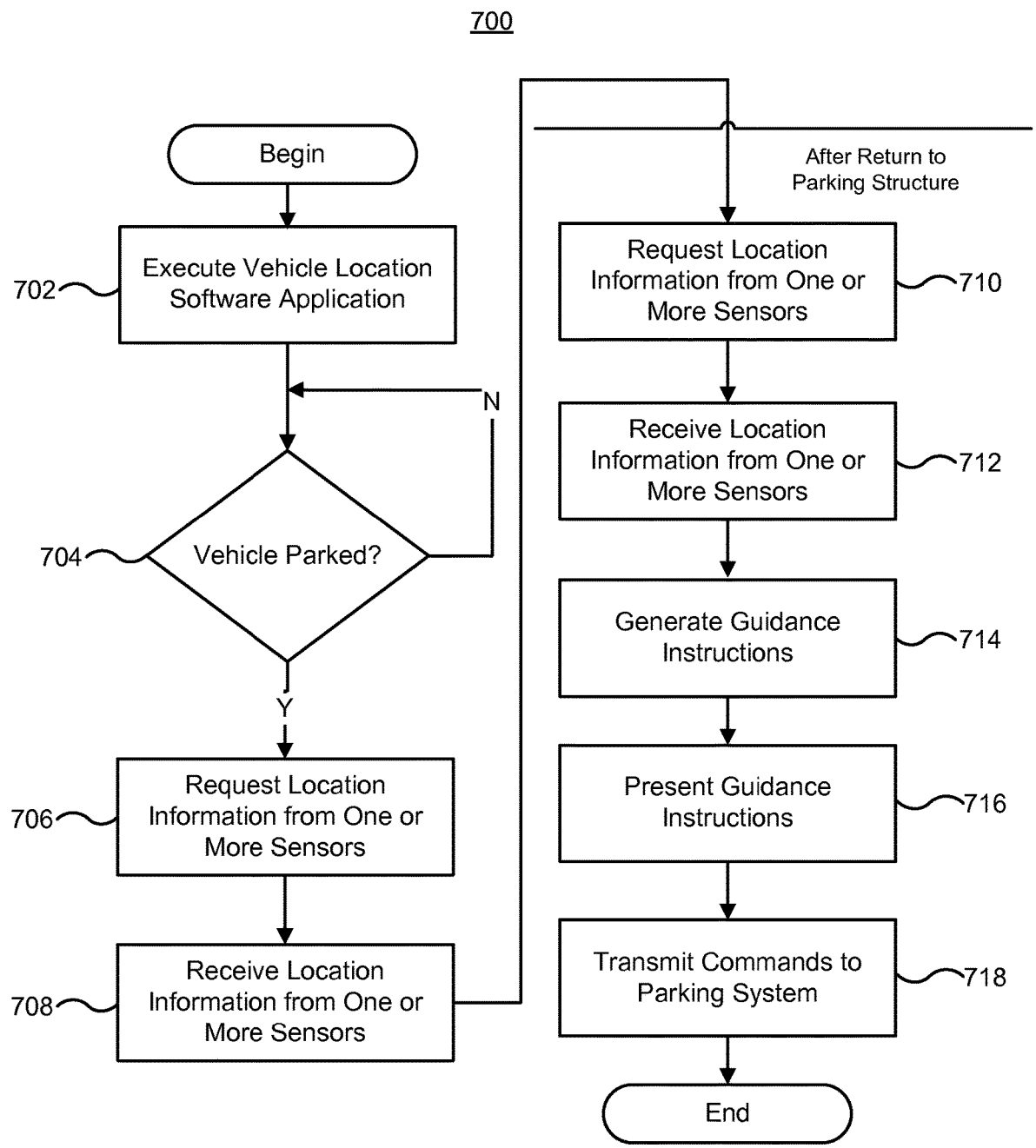
FIG. 7 is a flow diagram of a process usable by a portable computing device to locate a vehicle according to an embodiment of the present invention.
Figure 8:
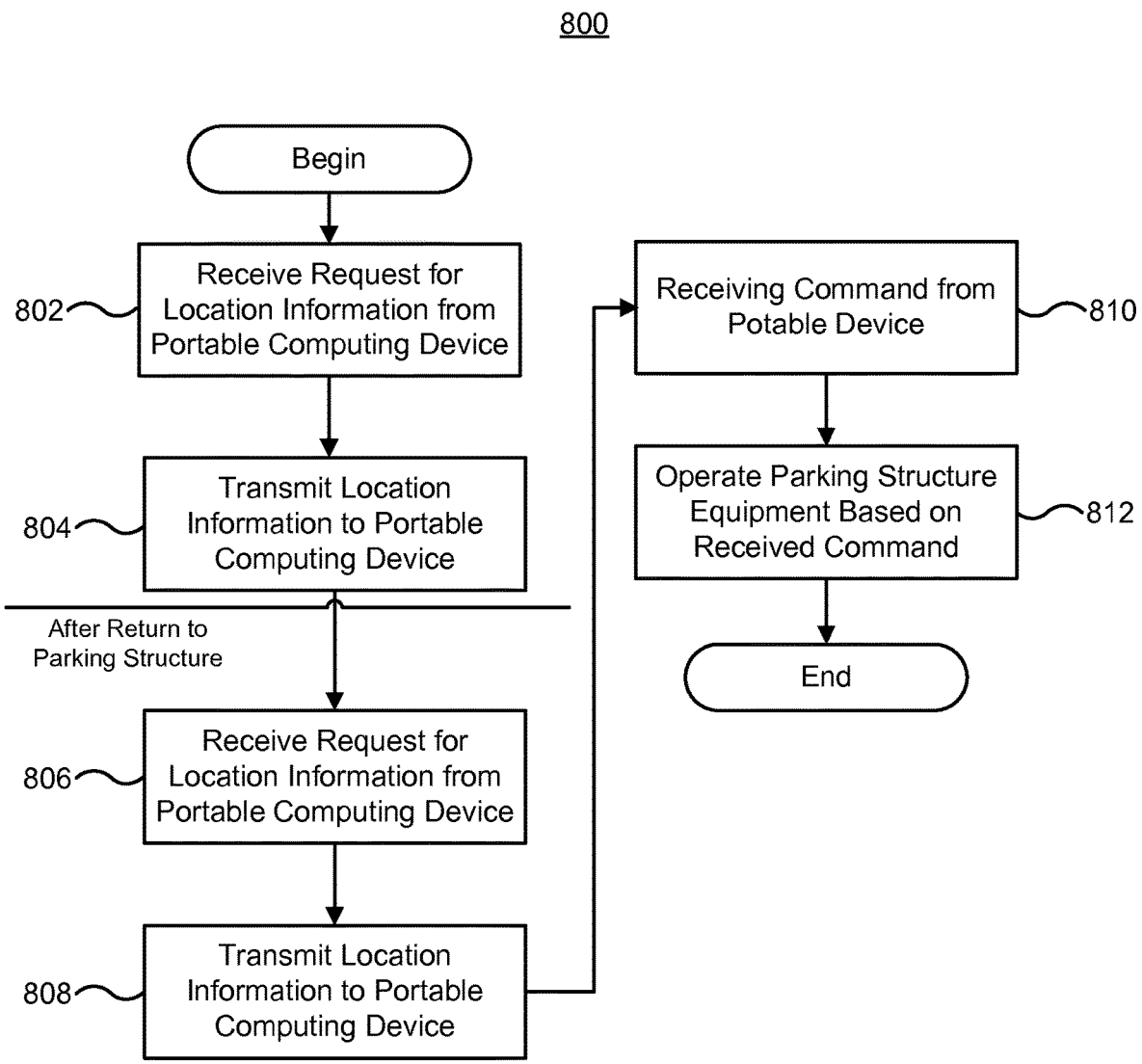
FIG. 8 is a flow diagram of a process usable by a parking system to locate a vehicle according to an embodiment of the present invention.
Figure 10:
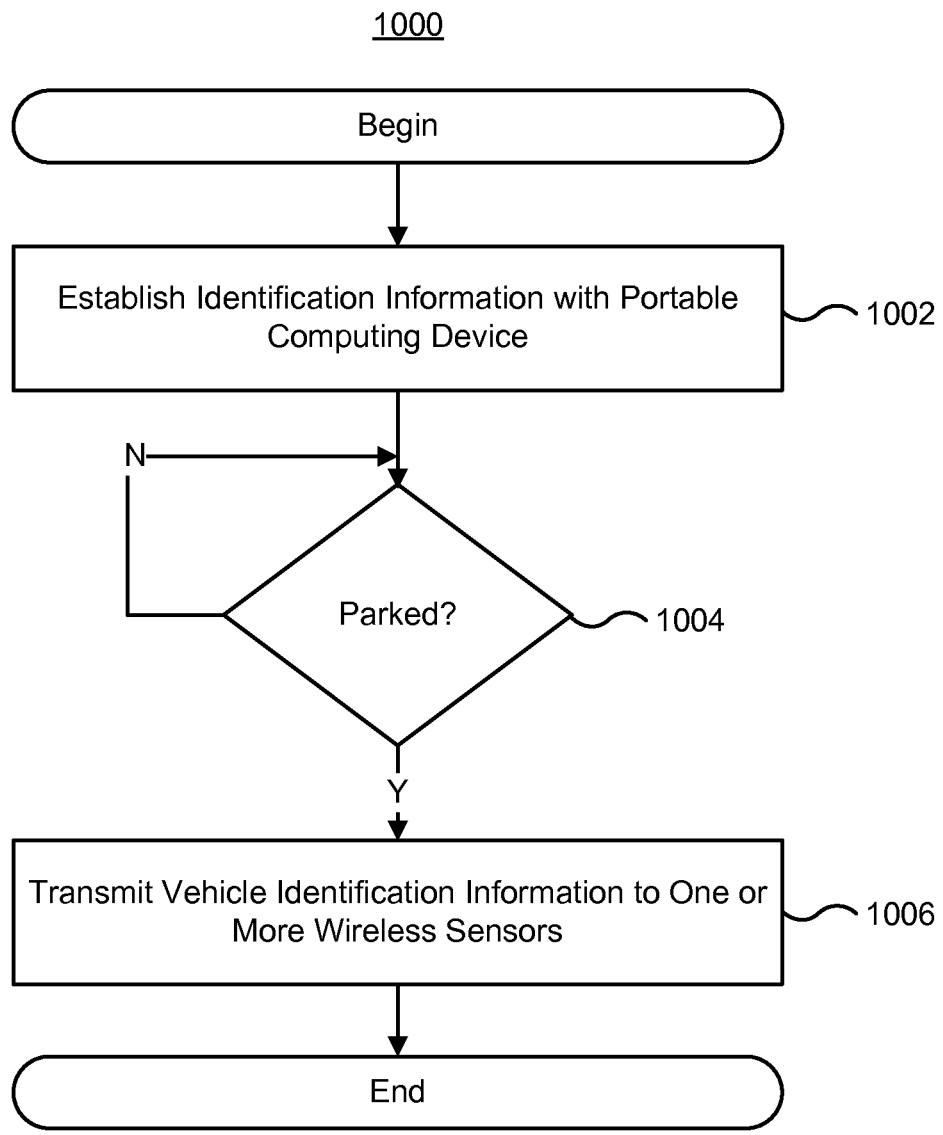
FIG. 10 is a flow diagram of a process usable by a vehicle to support the locating of the vehicle according to another embodiment of the present invention.
Figure 11:
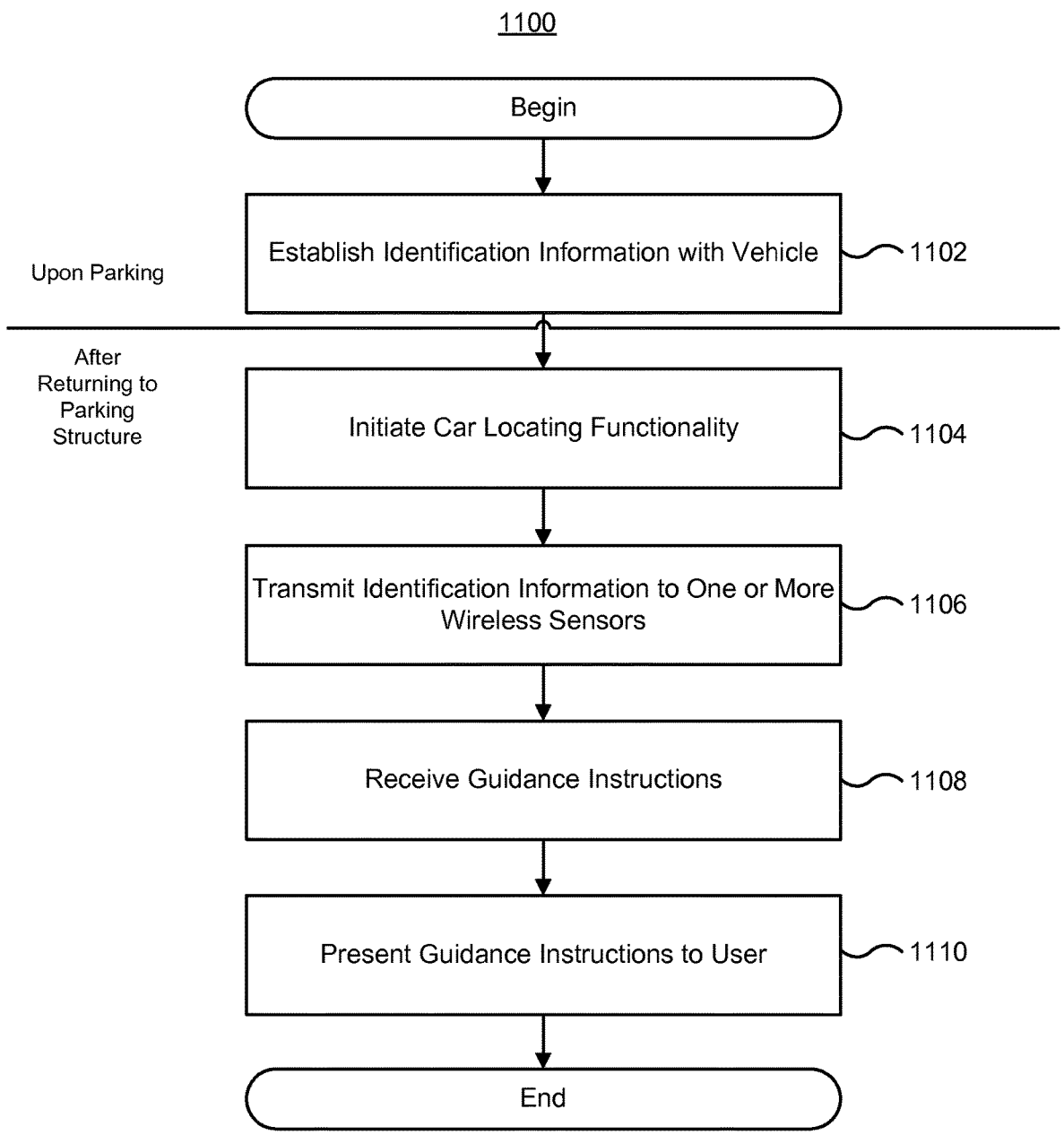
FIG. 11 is a flow diagram of a process usable by a portable computing device to locate a vehicle according to another embodiment of the present invention.
Figure 12:
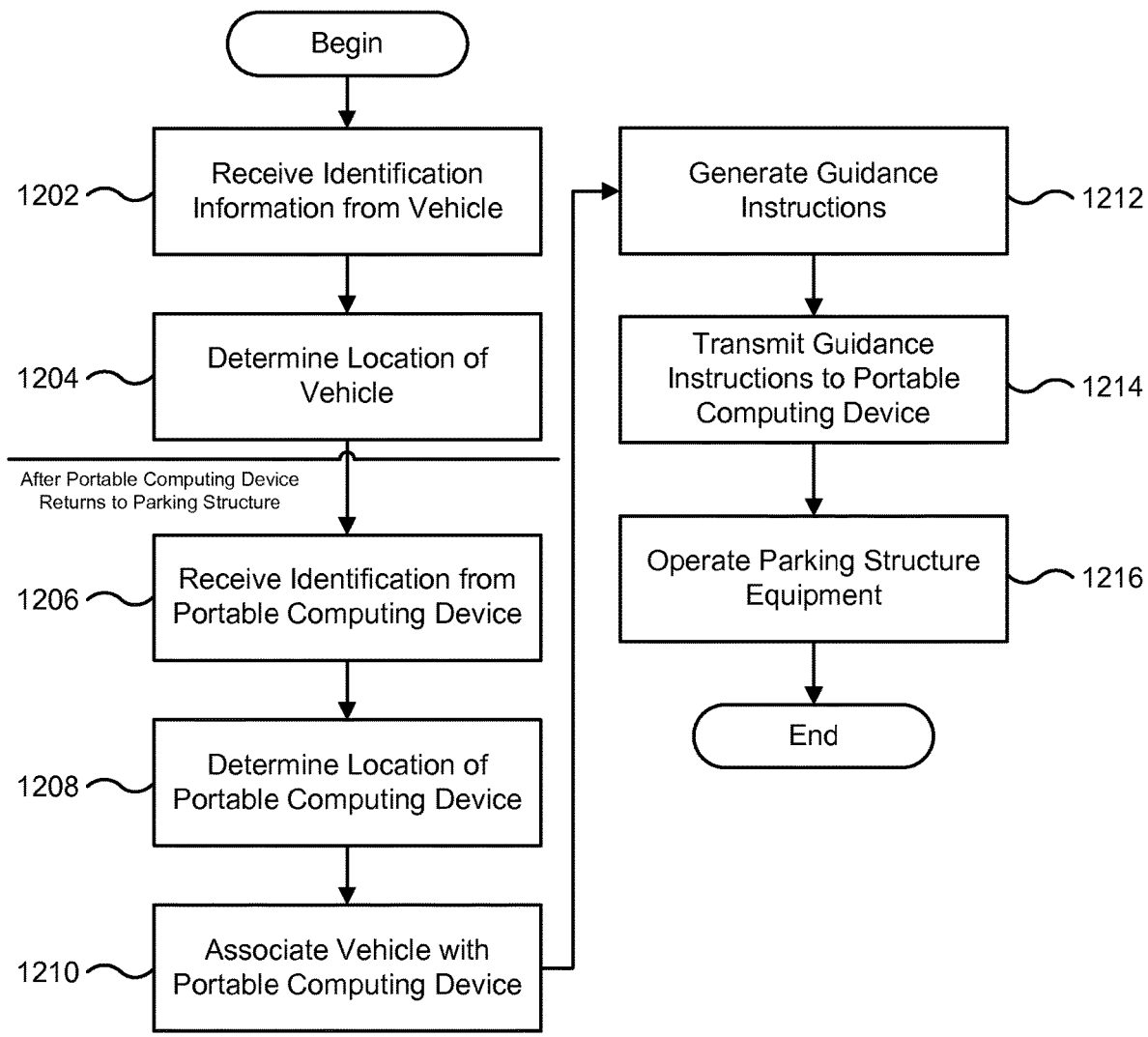
FIG. 12 is a flow diagram of a process usable by a parking system to locate a vehicle according to another embodiment of the present invention.

FIGS. 7 and 8 are directed to the first class of embodiments. FIGS. 10-12 are directed to the second class of embodiments.

FIG. 7 is a flow diagram of a process 700 for locating a vehicle according to one embodiment. Process 700 can be performed by e.g., portable computing device 102 of FIG. 1. Process 700 can be used, in certain embodiments, by portable computing device 102 to communicate with parking system 104 and vehicle 116. Communications between portable computing device 102, parking system 104, and vehicle 116 can be facilitated by, for example, one or more Bluetooth and/or Bluetooth LE connections. In some embodiments, connection procedures between the various entities can be performed in order to establish the one or more Bluetooth and/or Bluetooth LE connections.

At block 702, portable computing device 102 can execute a vehicle location application. The vehicle location application can be a software application that enables portable computing device 102 to communicate and interact with vehicle 116 and the wireless sensors of parking system 104. For example, by executing the vehicle location application, portable computing device 102 can transmit identification, payment, and/or other information to parking system 104. As another example, by executing the vehicle location application, portable computing device 102 can receive location information and/or other information from parking system 104. In some embodiments, the vehicle location application can be stored in a storage module of portable computing device 102 by the manufacturer or user of portable computing device 102.

Portable computing device 102 can initiate the execution of the vehicle location application in response to any suitable indicator or condition. For example, in certain embodiments, a user can indicate to portable computing device 102 that the vehicle location application should be executed. Illustratively, portable computing device 102 can present, via a touch screen, a graphical user interface that includes images or icons associated with various software applications. A user can select an icon associated with the vehicle location application e.g., by tapping a region of the touch screen displaying the icon. In response, portable computing device 102 can execute the vehicle location application.

As another example, portable computing device 102 can continuously or periodically determine whether the portable computing device is currently within or in proximity to parking system 104. If portable computing device 102 determines that it is currently within or in proximity to the parking system, the portable computing device can automatically execute the vehicle location application. For example, as portable computing device 102 enters a parking structure associated with parking system 104, the portable computing device can receive a data signal from a wireless sensor of parking system 104. The wireless sensor can be embedded in, for example, an entrance gate of the parking structure. In some embodiments, the received data signal can include a parking system identifier such that portable computing device 102 can determine that the data signal is received from parking system 104. In response to receiving the data signal, portable computing device 102 can execute the vehicle location application.

In some embodiments, portable computing device 102 can store a map and/or other guidance information for the parking structure. In some embodiments, the map can be used to generate guidance instructions, as will be described in greater detail below. In some embodiments, the guidance information can include information suitable for generating a visual representation of the parking structure on a display (e.g., a touch screen). Illustratively, the guidance information can include information that enables generation of a three-dimensional representation of the parking structure that shows the structure's general layout.

Portable computing device 102 can obtain a map and/or other guidance information for the parking structure in any suitable manner. For example, a user of portable computing device 102 can download (e.g., from the Internet) a map for the parking structure to the portable computing device prior to entering the parking structure. As another example, a map for the parking structure can be included with the vehicle location application. In such an example, when the vehicle location application is installed onto portable computing device 102, the map for the parking structure can additionally be installed. As still another example, a map for the parking structure can be transmitted to portable computing device 102 as the portable computing device enters the parking structure. For example, a map for the parking structure can be transmitted to portable computing device 102 by a wireless sensor embedded in the entrance gate of the parking structure. In some embodiments, the vehicle location application can also dynamically update a cache of maps, such that when the user enters the parking structure, the application can check if it already has a map for the parking structure. If the vehicle location application does not have the map, it can, in some embodiments, download the map from the Internet, a server, or communicate with system 104.

At decision 704, portable computing device 102 can continuously or periodically determine whether vehicle 116 is currently in a parked state. For example, as the user of vehicle 116 operates the vehicle within the parking structure (e.g., in order to locate a parking stall), portable computing device 102 can continuously monitor the state of the vehicle to determine whether the vehicle has been parked. Portable computing device 102 can determine the state of vehicle 116 in any suitable manner and using any suitable information.

In some embodiments, portable computing device 102 can determine the state of vehicle 116 based on information collected and/or received from various modules embedded in the portable computing device. For example, portable computing device 102 can determine that the vehicle is currently stationary based on information collected by a GPS module embedded in the portable computing device. In particular, portable computing device 102 might determine, based on the coordinates provided by a GPS module, that the portable computing device has not changed location for a specific period of time (e.g., 30 seconds, 1 minute, etc.). Based on such a determination, portable computing device 102 can determine that vehicle 116 is currently in a parked state. As another example, portable computing device 102 can determine that a door of vehicle 116 is currently opened based on information collected from a sensor module, a camera module, a microphone, etc. In some instances, portable computing device 102 can use an embedded camera module to determine whether a passenger compartment light of the vehicle is currently illuminated. Illumination of the compartment light might indicate that the door of the vehicle is currently open, which can further indicate that vehicle 116 is currently parked. In other instances, portable computing device 102 can use an embedded microphone to determine whether a particular warning sound is being broadcasted by vehicle 116. The sound can indicate that the door of the vehicle is currently open. Based on such a determination, portable computing device 102 can determine that the vehicle is currently in a parked state. As still another example, portable computing device 102 can receive a specific input from a user indicating that vehicle 116 is currently parked. For example, portable computing device 102 can display a "my car is parked" button on a touch screen. A user can touch the region of the touch screen where the button is displayed to indicate to portable computing device 102 that vehicle 116 is currently parked.

In some embodiments, portable computing device 102 can determine that vehicle 116 is currently in a parked state based on any suitable combination of collected and/or received information. For example, portable computing device 102 can determine that vehicle 116 is currently parked if portable computing device 102 has been substantially stationary for a certain period of time and vehicle 116 is currently broadcasting a warning sound indicating that its door is currently open. By determining the state of vehicle 116 through using multiple indicators, portable computing device 102 can more reliably determine the state of the vehicle.

In certain embodiments, portable computing device 102 can determine the state of vehicle 116 based on state information received directly from the vehicle. Illustratively, portable computing device 102 and the vehicle can establish a connection with one another (e.g., a Bluetooth or Bluetooth LE connection). After establishing the connection, portable computing device 102 can periodically or continuously receive state information from the vehicle. Illustratively, portable computing device 102 can receive, from the vehicle, the current state of the vehicle's engine, the position of the transmission of the vehicle, etc. During operation, portable computing device 102 can receive information indicating that the vehicle's engine is currently turned off and/or the vehicle's transmission is in park. Based on this information, portable computing device 102 can determine that the vehicle is currently in a parked state. In other embodiments, vehicle 116 can directly indicate to portable computing device 102 that the vehicle is currently parked.

According to some embodiments, portable computing device 102 can determine the state of a vehicle based on the portable computing device's connection with vehicle 116. Illustratively, portable computing device 102 and vehicle 116 can establish a connection with one another (e.g., a Bluetooth or Bluetooth LE connection). During operation, portable computing device 102 can periodically or continuously monitor its connection with the vehicle. If the connection is terminated or the vehicle is no longer responsive over the connection, portable computing device 102 can determine that the vehicle has been turned off (e.g. both the vehicle's engine and electrical system have been shut down). Based on this information, portable computing device 102 can determine that the vehicle is currently in a parked state. In some embodiments, the termination of the connection can be abrupt or without warning.

If portable computing device 102 determines that vehicle 116 is currently not in a parked state, the portable computing device can continue to monitor the state of the vehicle. If portable computing device 102 determines that the vehicle is currently in a parked state, the process can proceed to block 706.

At block 706, portable computing device 102 can request location information from a first set of one or more wireless sensors (e.g., wireless sensor 106) of parking system 104. In some embodiments, portable computing device 102 can request location information from a single wireless sensor. The wireless sensor can be the sensor which is closest in proximity to the portable computing device. For example, wireless sensor 106 can be a sensor situated in the parking stall in which vehicle 116 is currently parked. As another example, wireless sensor 106 can be a sensor situated in a row of parking stalls in which vehicle 116 is currently parked. In some embodiments, portable computing device 102 can automatically connect to the wireless sensor with the strongest signal strength. In other embodiments, portable computing device 102 can be configured to request location information from more than one wireless sensor.

At block 708, portable computing device 102 can receive location information from the one or more wireless sensors. The location information received from the wireless sensors can include any suitable information for determining the location of vehicle 116. Illustratively, the location information can include coordinates, a parking stall number, a parking structure aisle number, a parking structure floor number, a wireless sensor identifier, and/or the like. In some embodiments, for example, portable computing device 102 can receive, from a wireless sensor situated in the parking stall, a stall number. In other embodiments, as another example, portable computing device 102 can receive, from multiple wireless sensors, positioning information (e.g., coordinates) and parking structure floor information for each wireless sensor.

In some embodiments, portable computing device 102 can determine a location for vehicle 116. According to certain embodiments, portable computing device 102 can compute the location for vehicle 116 based on the location information received from the one or more wireless sensors at block 708, and/or on the wireless signal characteristics associated with each of the one or more wireless sensors. Illustratively, portable computing device 102 can, as discussed, receive location information from multiple wireless sensors. Portable computing device 102 can additionally determine the direction from which each wireless sensor's signal is received and the strength of each signal. Based on the signal strengths and signal directions, portable computing device 102 can calculate the relative distances of each of the wireless sensors from the portable computing device. Based on the calculated distances and each sensor's location information, portable computing device 102 can estimate the location of vehicle 116.

For example, portable computing device 102 can receive positioning information (e.g., coordinates), wireless sensor identifiers, or any suitable information from two wireless sensors, A and B, within a parking structure. The received information can indicate the position of each wireless sensor within the parking structure. In addition to receiving such information, portable computing device 102 can determine the direction from which each sensor's wireless signal is received and the relative strength of the signal. Portable computing device 102 can use such information to estimate the approximate distance of each wireless sensor from the portable computing device. Illustratively, portable computing device 102 can determine that wireless sensor A is 3 feet away in a first direction and that wireless sensor B is 8 feet away in a second direction. Based on this information and the positioning information for each sensor, portable computing device 102 can determine the approximate location of vehicle 116 within the parking structure.

In other embodiments, portable computing device 102 might not be required to determine the location of vehicle 116. In such embodiments, portable computing device 102 can receive location information for vehicle 116 directly from a wireless sensor. For example, portable computing device 102 can receive a specific parking stall number from a wireless sensor.

In some embodiments, the location of vehicle 116 can be stored in storage module 310 of portable computing device 102. In some embodiments, the data can be stored such that the location of vehicle 116 is not deleted if the vehicle location application terminates. As will be discussed, the location of vehicle 116 can later be used to generate guidance instructions, which can be used to help a user locate vehicle 116.

Following block 708, portable computing device 102 and its user can leave the vicinity of the parking structure. At a later time, the portable computing device 102 and its user can return to the vicinity of the parking structure.

At block 710, upon returning to the parking structure, portable computing device 102 can request location information from a second set of one or more wireless sensors (e.g., wireless sensor 108). The second set of one or more wireless sensors can be located in an area of the parking structure that is different from the area where the first set of one or more wireless sensors is located. The second set of wireless sensors can be, for example, located near the entrance of a stairwell of the parking structure. As another example, the wireless sensors can be situated within an elevator of the parking structure. As yet another example, the wireless sensors can be situated near a payment booth, payment machine, etc. of the parking structure.

In some embodiments, portable computing device 102 can initiate the request for location information in response to a user input. For example, the user of the portable computing device 102 can press a "find my car" button displayed on a touch screen of the portable computing device. In other embodiments, portable computing device 102 can initiate the request for location information automatically. For example, portable computing device 102 can automatically determine that it is once again in range of a wireless sensor of parking system 104 (after being out of range). In response, portable computing device 102 can generate a request for location information.

At block 712, portable computing device 102 can receive location information from the second set of one or more wireless sensors. The location information received from the wireless sensors can include any suitable information for determining the current location of portable computing device 102. Illustratively, the location information can include positioning information (e.g., coordinates), a parking structure floor number, a wireless sensor identifier, and/or the like.

In some embodiments, portable computing device 102 can determine its current location. In some embodiments, portable computing device 102 can compute its current location based on the location information received from the one or more wireless sensors at block 712. In certain embodiments, portable computing device 102 can determine its current location in a manner similar to its determination of the parking location for vehicle 116 (e.g. determining location based on signal direction, signal strength, etc.).

In certain embodiments, portable computing device 102 might not be required to determine its current location. For example, portable computing device 102 can receive its location information directly from a wireless sensor.

At block 714, portable computing device 102 can generate guidance instructions based on its current location and the parking location of vehicle 116. In particular, portable computing device 102 can use the current location of the portable computing device and the parking location of vehicle 116 to define a start point and an end point within a map of the parking structure. As described above, the map can have been previously stored or received by portable computing device 102. Based on the start and end points, portable computing device 102 can generate guidance instructions which can be used to direct the user of the portable computing device to vehicle 116. For example, the guidance instructions can indicate that a user "walk to the third floor," "walk left for 60 feet," etc. The guidance instructions can be generated in any suitable manner. For example, portable computing device 102 can compute the guidance instructions based on the shortest path from the start point to the end point, taking into account locations of stairs, elevators, walkways. Portable computing device 102 can additionally compute the guidance instructions based on user preferences, e.g., whether a user prefers to use stairs rather than an elevator, requires disability access, etc. Portable computing device 102 can alternatively compute the guidance instructions based on the number of instructions that must be presented to a user. In this way, directing a user to vehicle 116 can be simplified.

At block 716, portable computing device 102 can present the generated guidance instructions to a user. Illustratively, portable computing device 102 can display instructions for directing the user to vehicle 116 via a touch screen of the portable computing device. In some embodiments, portable computing device can additionally display visual cues, such as arrows or other indicators to aid the user. In certain embodiments, the portable computing device can additionally display a visual representation of the parking structure managed by parking system 104. Illustratively, portable computing device 102 can overlay the instructions on top of a three dimensional representation of the parking structure. The visual representation of the parking structure can be generated based on, for example, schematic information, etc. for the parking structure. In some embodiments, the guidance instructions can include audio announcements, and/or audio alerts. For example, an audio alert can be provided if the user is walking the wrong way, etc.

In some embodiments, portable computing device 102 can track the movement of the portable computing device through the parking structure. Portable computing device 102 can track the movement of the portable computing device in any suitable manner. For example, portable computing device 102 can receive location information from various wireless sensors located within the parking structure. Based on the determined current location of the portable computing device, portable computing device 102 can update the guidance instructions presented to the user. Illustratively, the first guidance instruction presented to the user can include an instruction to "walk left for 60 feet." After portable computing device 102 has determined that the user has moved 60 feet to the left, portable computing device 102 can display a subsequent instruction for guiding the user to vehicle 116.

At block 718, portable computing device 102 can transmit commands to parking system 104 in order to cause the parking system to operate certain parking system subsystems. Illustratively, portable computing device 102 can transmit a command to parking system 104 indicating the parking system operate an elevator in a certain manner. For example, portable computing device 102 and its user might currently be in an elevator located on the first floor of a parking structure. Vehicle 116 might be located on the third floor of the parking structure. During operation, portable computing device 102 can determine its current location and that, based on the guidance instructions, the user must be transported to the third floor. As a result, portable computing device 102 can transmit a command to a wireless sensor in the elevator. The command can indicate to parking system 104 that the elevator be moved to the third floor. In response, parking system 104 can operate the elevator such that the elevator is moved to the third floor. As a result, portable computing device 102 can be transported closer to vehicle 116. Transmission of commands to the parking system can occur at various points along the route from an initial location of portable computing device 102 to vehicle 116. In some embodiments, the portable computing device can continue to monitor the current location and provide instructions until the user arrives at the vehicle or turns off the guidance function.

In another embodiment, while a user is walking toward an elevator, the portable computing device can indicate to a sensor situated in the parking structure to call the elevator to the user's current floor, and also indicate where the user needs to go. In this way, elevator service can be coordinated and an elevator can be ready to pickup the user when the user arrives.

FIG. 8 is a flow diagram of a process 800 for locating a vehicle according to one embodiment. Process 800 can be a counterpart process to process 700 of FIG. 7. Process 800 can be performed by e.g., parking system 104 of FIG. 1. Process 800 can be used, in certain embodiments, by parking system 104 to communicate with portable computing device 102. Communications between parking system 104 and portable computing device 102 can be facilitated by, for example, one or more Bluetooth and/or Bluetooth LE connections. In some embodiments, connection procedures between the various entities can be performed in order to establish the one or more Bluetooth and/or Bluetooth LE connections.

At block 802, a first set of one or more wireless sensors (e.g., wireless sensors 106) of parking system 104 can receive a request for location information from portable computing device 102. In some embodiments, portable computing device 102 can request location information from a wireless sensor that is closest in proximity to the portable computing device. For example, wireless sensor 106 can be a sensor installed in the parking stall in which vehicle 116 is currently parked. As another example, wireless sensor 106 can be a sensor installed in a row of parking stalls where vehicle 116 is currently parked. In some embodiments, portable computing device 102 can automatically request location information from the wireless sensor with the strongest signal strength. In other embodiments, portable computing device 102 can request location information from multiple wireless sensors.

At block 804, the first set of one or more wireless sensors of parking system 104 can transmit location information to portable computing device 102. The location information can be any suitable information usable by portable computing device 102 for determining the location of vehicle 116. Illustratively, the location information can include positioning information (e.g., coordinates), a parking stall number, a parking structure floor number, a wireless sensor identifier, and/or the like.

Following block 804, portable computing device 102 can be moved from the vicinity of the parking structure. Subsequently, the portable computing device can be returned to the vicinity of the parking structure.

At block 806, a second set of one or more wireless sensors (e.g., wireless sensor 108) of parking system 104 can receive a request for location information from portable computing device 102. The second set of wireless sensors, in most instances, can be sensors that are located in a different area from the first set of wireless sensors, although there can be overlap. In some embodiments, the one or more wireless sensors of the second set can be situated at or in proximity to an entrance of the parking structure. For example, wireless sensor 108 can be located near the entrance of a stairwell of the parking structure. As another example, wireless sensor 108 can be situated within an elevator of the parking structure. As yet another example, wireless sensor 108 can be situated near a payment booth, payment machine, etc. of the parking structure.

At block 808, the second set of one or more wireless sensors can transmit location information to portable computing device 102. The location information can be any suitable information usable by portable computing device 102 for determining its current location. Illustratively, the location information can include positioning information (e.g., coordinates), a parking structure floor number, a wireless sensor identifier, and/or the like.

At block 810, parking system 104 can receive a command from portable computing device 102. In some embodiments, the command can indicate that the parking system operate a subsystem of the parking system, such as an elevator. For example, parking system 104 might receive a command from portable computing device 102 via a wireless sensor situated in an elevator of the parking system. The command might indicate to the parking system that the elevator be moved from a first floor of the parking structure to a second floor. At block 812, parking system 104 can operate the parking system subsystem in response to the received command at block 810.

Figure 9:
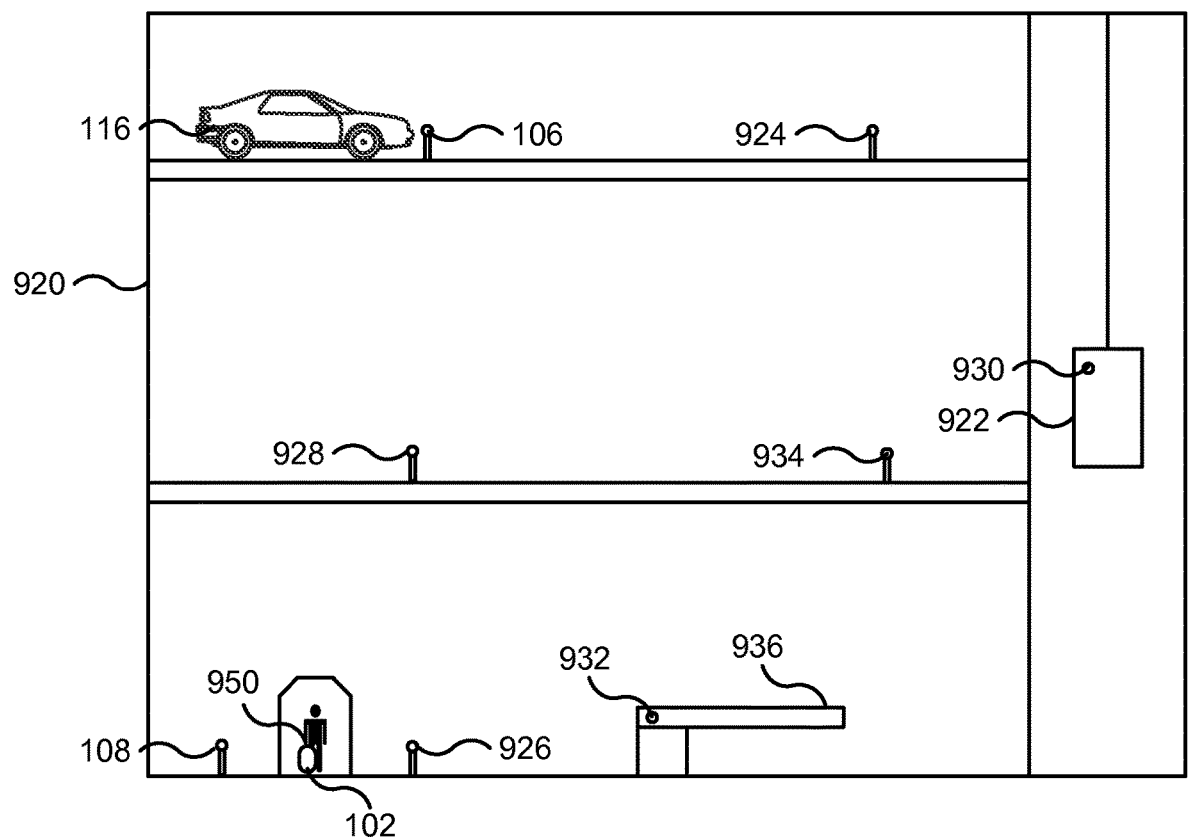
FIG. 9 illustrates an exemplary configuration of a parking system according to an embodiment of the present invention.

FIG. 9 illustrates an exemplary configuration 900 of a parking system according to an embodiment of the present invention. The parking system (e.g., parking system 104), which can include various wireless sensors, a parking garage gate, an elevator subsystem, and a server (not shown), can manage the operations of parking structure 920. As shown in FIG. 9, the various wireless sensors of parking system 104 can be deployed in several areas within parking structure 920. Portable computing device 102 can communicate with one or more of the wireless sensors at any given point in time in order to obtain location information. The location information received from the one or more wireless sensors can be used by portable computing device 102 to triangulate its current location and/or the location of vehicle 116. In some instances, shortly after vehicle 116 has been parked, portable computing device 102 can communicate with wireless sensors situated in proximity to vehicle 116 (e.g., wireless sensors 106 and 924). In doing so, portable computing device 102 can determine a parking location for vehicle 116. Thereafter, portable computing device 102 can be moved out of proximity of parking system 104 (e.g., the user 950 of portable computing device 102 can carry the device outside of the parking structure). Later, portable computing device 102 can be returned to the parking structure. At that time, portable computing device 102 can communicate with a different set of wireless sensors (e.g., wireless sensor 108 and 926) situated near an entry point of the parking structure. In doing so, portable computing device 102 can triangulate its current position and determine a path from its current position to the previously determined parking location of vehicle 116. Guidance instructions based on the determined path can then be provided to the user. As the user progresses to vehicle 116, portable computing device 102 can thereafter communicate with wireless sensors situated at different areas (e.g., wireless sensors 928 and 934) in the parking structure in order to triangulate the device's then current location and provide updated guidance instructions to the user.

As described previously, FIGS. 10-12 are directed to a second class of embodiments where a server of a parking system can interpret sensor data, determine a parking location for a vehicle, determine a current location for a portable computing device, transmit guidance instructions to the portable computing device, and operate a parking subsystem (e.g., an elevator).

FIG. 10 is a flow diagram of a process 1000 for supporting the locating of a vehicle according to one embodiment. Process 1000 can be performed by e.g., vehicle 116 of FIG. 2. Process 1000 can be used, in certain embodiments, by vehicle 116 to communicate with parking system 104 and portable computing device 102. Communications between vehicle 116, parking system 104, and portable computing device 102 can be facilitated by, for example, one or more Bluetooth and/or Bluetooth LE connections. In some embodiments, connection procedures between the various entities can be performed in order to establish the one or more Bluetooth and/or Bluetooth LE connections.

At block 1002, vehicle 116 can establish identification information (e.g., an identifier) with portable computing device 102 in order to enable parking system 104 to later determine that vehicle 116 is associated with portable computing device 102. Establishment of the identification information can occur prior to vehicle 116 being parked in the parking structure managed by parking system 104. An identifier can be any suitable numeric or alphanumeric value. For example, the identifier can be the Bluetooth device address (e.g., BD_ADDR) for a Bluetooth module of vehicle 116.

At decision 1004, vehicle 116 can determine whether it is currently in a parked state. Vehicle 116 can determine its state in any suitable manner and using any suitable criteria. Suitable criteria can include the operational state of certain vehicle components, the length of time the vehicle has been in a certain operational state, etc. For example, vehicle 116 can determine that it is currently in a parked state if the vehicle's engine is currently turned off. As another example, vehicle 116 can determine that it is currently in a parked state if the vehicle has been stationary for minutes or more. As still another example, vehicle 116 can determine that 5 it is currently parked if its transmission is in park, its parking break is engaged, etc.

At block 1006, vehicle 116 can transmit the identification information established at block 1002 to one or more wireless sensors of parking system 104 (e.g., wireless sensor 106). In some embodiments, vehicle 116 can transmit the identification information to a single sensor that is closest in proximity to the portable computing device. For example, wireless sensor 106 can be a sensor situated in the parking stall in which vehicle 116 is currently parked. As another example, wireless sensor 106 can be a sensor situated in a row of parking stalls where vehicle 116 is currently parked. In some embodiments, vehicle 116 can automatically connect to the wireless sensor with the strongest signal strength.

In some embodiments, vehicle 116 can generally broadcast its identification information to one or more wireless sensors. Each wireless sensor can communicate, to server 402 of parking system 104, the identification information, the strength of the broadcast signal, and/or the direction from which the broadcast signal is received. Based on this information, server 402 can determine the location of vehicle 116.

FIG. 11 is a flow diagram of a process 1100 for locating a vehicle according to one embodiment. Process 1100 can be performed by e.g., portable computing device 102 of FIG. 2. Process 1100 can be used, in certain embodiments, by portable computing device 102 to communicate with parking system 104 and vehicle 116, where vehicle 116 has transmitted its location to parking system 104. Process 1100 can be used, e.g., after the portable computing device has left the proximity of parking system 104 and subsequently returned, to assist a user in locating vehicle 116. Communications between portable computing device 102, vehicle 116 and parking system 104 can be facilitated by, for example, one or more Bluetooth and/or Bluetooth LE connections. In some embodiments, connection procedures between the various entities can be performed in order to establish the one or more Bluetooth and/or Bluetooth LE connections.

At block 1102, portable computing device 102 can establish identification information with vehicle 116. In particular, portable computing device 102 and vehicle 116 can establish an identifier that can be used with parking system 104. The identifier can enable parking system 104 to determine that vehicle 116 is associated with portable computing device 102. The actions associated with block 1102 can be performed at or near the time the user parks the vehicle; for example, after the user parks but before she exits the parking structure.

At block 1104, portable computing device 102 can initiate a vehicle locating function on the portable computing device (e.g., initiate execution of a vehicle location application). Initiation of the vehicle locating functionality can be in response to a user input. For example, the user can tap on a "find my car" button displayed on a touch screen of the portable computing device.

At block 1106, portable computing device 102 can transmit or broadcast identification information to one or more wireless sensors (e.g., wireless sensor 108) of parking system 104. The identification information can be used by parking system 104 to associate portable computing device 102 with vehicle 116. In some embodiments, the one or more wireless sensors can be located in an area of the parking structure that is different from the area where the wireless sensors with which vehicle 116 communicated are located. For example, the one or more wireless sensors can be located near a pedestrian entrance of the parking structure. As another example, the one or more wireless sensors can be situated within an elevator of the parking structure. As yet another example, the one or more wireless sensors can be situated near a payment booth, payment machine, etc. of the parking structure.

At block 1108, portable computing device 102 can receive guidance instructions from parking system 104 via one or more wireless sensors. The guidance instructions can include any suitable information for directing a user to vehicle 116. For example, the guidance instructions can include step by step directions for a route to vehicle 116. In some embodiments, the guidance instructions can include information for generating a visual representation of the parking structure. For example, the information can include parking structure schematics, a parking structure map, images, etc.

At block 1110, portable computing device 102 can present the received guidance instructions to its user. Illustratively, portable computing device 102 can display instructions for directing the user to vehicle 116 via a touch screen of the portable computing device. In some embodiments, portable computing device can additionally display visual cues, such as arrows or other indicators to aid the user. In certain embodiments, the portable computing device can additionally display a visual representation based on the parking structure representation received from parking system 104. Illustratively, portable computing device 102 can overlay the instructions on top of a three dimensional visual representation of the parking structure.

In some embodiments, portable computing device 102 or server 402 of parking system 104 can track the movement of the user and/or portable computing device through the parking structure. Based on the determined current location of the user and/or portable computing device, server 402 and/or portable computing device 102 can update the guidance instructions presented to the user.

FIG. 12 is a flow diagram of a process 1200 for locating a vehicle according to one embodiment. Process 1200 can be performed by e.g., parking system 104 of FIG. 2. Process 1200 can be used, in certain embodiments, by parking system 104 in conjunction with processes 1000 and 1100 described above. Communications between parking system 104, and portable computing device 102 and vehicle 116 can be facilitated by, for example, one or more Bluetooth and/or Bluetooth LE connections. In some embodiments, connection procedures between the various entities can be performed in order to establish the one or more Bluetooth and/or Bluetooth LE connections.

At block 1202, parking system 104 can receive identification information from vehicle 116. In some embodiments, the identification information can be received via a first set of one or more wireless sensors of parking system 104 (e.g., wireless sensor 106).

At block 1204, server 402 of parking system 104 can determine a location for vehicle 116. In some embodiments, the location of vehicle 116 can be based on the location of one or more wireless sensors (e.g., wireless sensor 106). For example, wireless sensor 106 can be a sensor situated in the parking stall at which vehicle 116 is currently parked. As such, server 402 can determine that vehicle 116 is located at the parking stall at which wireless sensor 106 is located. As another example, server 402 can determine the parking location of vehicle 116 based on information received from multiple wireless sensors. For example, each of the wireless sensors can have received identification information from vehicle 116. Parking system 104 can receive the identification information via each of the wireless sensors in addition to the signal strength of the connection between each wireless sensor and vehicle 116. Parking system 104 can additionally receive, for each wireless signal, the direction from which vehicle's 116 wireless signal is received. Illustratively, parking system 104 might receive information that vehicle's 116 wireless signal is received from the left of a particular wireless sensor. Based on this information, server 402 can triangulate the location of vehicle 116 using the received information and the predefined positions of the wireless sensors known to parking system 104.

In some embodiments, parking system 104 can store the identification information received from vehicle 116 in association with the determined location in, for example, a parking locator database stored on a storage module of the parking system.

Following block 1204, portable computing device 102 and its user can leave the vicinity of the parking structure managed by parking system 104. Thereafter, the portable computing device and user can return to the parking structure.

At block 1206, parking system 104 can receive identification information from portable computing device 102. In some embodiments, the identification information can be received via a second set of one or more wireless sensors of (e.g., wireless sensor 108). In certain embodiments, the second set of wireless sensors can be located in an area of the parking structure that is different from the area where the first set of wireless sensors are located. The second set of one or more wireless sensors can be, for example, located near the entrance of a stairwell of the parking structure. As another example, the second set of wireless sensors can be situated within an elevator of the parking structure. As yet another example, the second set of wireless sensors can be situated near a payment booth, payment machine, etc. of the parking structure.

At block 1208, server 402 of parking system 104 can determine a location for portable computing device 102. In some embodiments, the location of portable computing device 102 can be based on the location of the one or more wireless sensors receiving the transmission at block 1206. For example, wireless sensor 108 can be a sensor situated in proximity to where portable computing device 102 is currently located. As such, server 402 can determine that portable computing device 102 is located near where wireless sensor 108 is located. As another example, server 402 can determine the location of portable computing device 102 based on information received from multiple wireless sensors. For example, each of the wireless sensors can have received identification information from portable computing device 102. Parking system 104 can receive the identification information via each of the wireless sensors in addition to the signal strength of the connection between each wireless sensor and portable computing device 102. Parking system 104 can additionally receive, for each wireless signal, the direction from which portable computing device's 102 wireless signal is received. Illustratively, parking system 104 might receive information that portable computing device's 102 wireless signal is received from the left of a particular wireless sensor. Based on this information, server 402 can triangulate the location of portable computing device 102 using the received information and the predefined positions of the wireless sensors known to parking system 104.

At block 1210, server 402 can associate portable computing device 102 with vehicle 116. In particular, parking system 104 can match the identification information received from vehicle 116 at block 1202 with the identification information received from portable computing device 102 at block 1206. For example, parking system 104 can perform a search of its parking locator database in order to find identification information matching the identification information received from portable computing device 102. In locating a match, parking system 104 can determine the parking location for vehicle 116. For example, parking system 104 can retrieve a record matching the identification information received from portable computing device 102. The record can include the parking location for vehicle 116.

At block 1212, server 402 can generate guidance instructions. In some embodiments, parking system 104 can generate the guidance instructions using the determined current location of portable computing device 102 and the parking location of vehicle 116. For example, parking system 104 can define a start point and an end point within a map of the parking structure managed by the parking system based on the location of portable computing device 102 and the parking location of vehicle 116. Based on the start and end points, parking system 104 can generate guidance instructions, which can be used to direct the user of the portable computing device to vehicle 116. In some embodiments, the generated guidance instructions can include step by step instructions for a route to vehicle. In some embodiments, the guidance instructions can include information for generating a visual representation of the parking structure. The information can include, for example, parking structure schematics, the parking structure map, images, etc.

At block 1214, parking system 104 can transmit the guidance instructions to portable computing device 102 (e.g., via its wireless sensors). In some embodiments, parking system 104 can track the movement of the portable computing device through the parking structure. Parking system 104 can track the movement of the portable computing device in any suitable manner. For example, parking system 104 can receive location information from one or more of its wireless sensors located within the parking structure. Based on the determined current location of the portable computing device, parking system 104 can provide updated guidance instructions to portable computing device 102.

At block 1216, parking system 104 can operate a parking subsystem, such as an elevator, based on the guidance instructions. For example, parking system 104 can determine that portable computing device 102 is currently within an elevator of the parking structure. Parking system 104 might additionally determine that the elevator is currently located at the first floor and vehicle 116 is located on the fourth floor of the parking structure. As such, parking system 104 can operate the elevator such that portable computing device 102 is moved to the fourth floor. In some embodiments, parking system 104 can send the elevator to the current floor where a user is located while directing the user to the elevator. Operation of the parking subsystem can occur at point along the route from an initial location of portable computing device 102 to vehicle 116.

It will be appreciated that the embodiments illustrated in FIGS. 8-12 can provide additional functionality in addition to assisting in locating a vehicle. Illustratively, parking system 104 can be configured to perform access control functionalities. For example, parking system 104 can be configured to generate an electronic ticket and issue the ticket to a portable computing device. As another example, parking system 104 can be configured to receive and process payment information from a portable computing device. As still another example, parking system 104 can provide real-time information regarding the open parking stalls within the parking structure that it manages. In such an example, parking system 104 can additionally provide, to a portable computing device and/or vehicle, directions to an open parking stall.

It will be further appreciated that although the embodiments illustrated in FIGS. 8-12 describe specific location schemes and structures, any suitable scheme and structure can be used. For example, the embodiment described in FIGS. 7-8 can employ a scheme in which parking system 104 can be configured to determine the location of vehicle 116 and generate guidance instructions. As another example, the embodiment in FIGS. 8-12 can employ any suitable commands, APIs, and/or the like to enable the various entities presented in the embodiments to communicate.

It will be further appreciated that embodiments illustrated in FIGS. 8-12 can implement any suitable security mechanisms to ensure that information exchanged between the entities (e.g., vehicles, parking systems, and portable computing devices) are not improperly compromised, modified, obtained, etc. For example, the embodiments described in FIGS. 8-12 can employ any suitable symmetric and asymmetric cryptographic scheme.

As used herein, the term parking structure can include garages, surface or rooftop lots, etc., which include any number of levels, including a single level.

Embodiments can include any suitable permutation for enabling the location of a vehicle within a parking structure using a portable computing device, a parking system, and/or a vehicle. For example, the parking location of a vehicle can be determined through communication between a portable computing device and a parking system, through communication between a vehicle and a parking system, or any combination thereof. As another example, a portable computing device can be provided with a map of a parking structure and can use the map to determine directions to a parking location, or a server of a parking system can determine the directions to a parking location and transmit directions, images, etc. to a portable computing device.

In some embodiments, a portable computing device can primarily use a GPS module for guidance outside of a parking structure (e.g., help a user locate the parking structure within, for example, a city). Once the portable computing device is within the parking structure, Bluetooth, Bluetooth LE, or any other suitable wireless communication standard can be primarily used for guidance.

As described herein, embodiments can provide for reliable, power efficient, and cost effective locating of vehicles. More specifically, many parking structures are typically enclosed and/or built underground and/or on multiple levels. Due to such configurations, conventional location systems based solely on GPS are often ineffective. For example, GPS signals often are unable to reach devices that are underground or to distinguish between levels within a structure. Through leveraging a network of Bluetooth or Bluetooth LE sensors, embodiments can enable the reliable locating of vehicles. Furthermore, by leveraging Bluetooth and/or Bluetooth LE technologies, embodiments can enable several cheap and power efficient sensors to be deployed. By making the deployment of multiple sensors cost effective, embodiments can enable the accurate triangulation of portable computing device and/or vehicle locations. In particular, as the number of sensors is increased, the accuracy of determining the specific of location of a portable computing device and/or vehicle can be made more accurate.

The guidance information provided in various embodiments can include any visual and/or audio information that can assist a user in locating a parked vehicle. Examples include a parking stall identifier, an aisle identifier, and/or a floor or parking level identifier; such identifiers can include numbers, letters or words, pictograms, colors, or any other distinguishing feature. In some embodiments, the identifier may be displayed on the portable device or announced audibly. In some embodiments, guidance information may include a map of the parking structure with the parking location highlighted or otherwise marked; navigational guidance (e.g., step-by-step instructions indicating which direction to move) can be provided but is not required.

In addition to guidance information, some embodiments can also provide payment information. For example, when a user parks, the payment information may indicate the rate charged by an operator of the parking structure for that particular stall or an approximate total charge based on information provided by the user indicating how long she intends to park. When a user returns to a vehicle, the payment information can indicate the amount due and can also indicate how and/or where payment can be made, e.g., by providing guidance information indicating the location of a payment kiosk. In some embodiments a user with a suitably equipped portable device may be able to communicate with the parking system to pay for parking directly from her portable device.

In some embodiments, some or all of the operations described herein can be performed using an application executing on the user's portable device. For example, the application can obtain and store parameters defining the shape of the parking structure and the locations of the various sensors, associating a sensor identifier with each location. In such embodiments, the sensors in the parking structure can transmit their identifiers, and the application can determine the locations of the sensors using the stored information. The application can then generate guidance information based on the received sensor identifiers and the stored parameters for the parking structure the user is currently in. In some embodiments, parking structure parameters can be downloaded and stored on an as-needed basis, e.g., when the user enters the parking structure; the application can obtain the parameters by communicating with the parking system installed in the structure or via another source such as a server connected to the network. The correct structure can be identified, e.g., based on GPS coordinates and/or identifying information transmitted by the parking system. In other embodiments, the application may be pre-loaded with information for at least some parking structures.

Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Although the invention has been described with respect to specific embodiments, it will be appreciated that the invention is intended to cover all modifications and equivalents within the scope of the following claims.

What is claimed is:

1. A portable computing device, comprising:
   a display;
   a wireless communication circuit; and
   one or more processors connected to the display and the wireless communication circuit, wherein the one or more processors are configured to:
      transmit, by the wireless communication circuit to a first wireless sensor of a plurality of wireless sensors of a parking system for a parking structure, a request for location information, wherein the first wireless sensor is installed in a first fixed location in the parking structure;
      receive, by the wireless communication circuit, a first signal from the first wireless sensor, wherein the first signal comprises the location information, wherein the location information is based on the first fixed location of the first wireless sensor;
      store an indication of a parking location of a vehicle based at least in part on the location information;
      receive a second signal from a second wireless sensor of the plurality of wireless sensors of the parking system, wherein the second wireless sensor is installed in a second fixed location in the parking structure that is different from the first fixed location;
      determine a current location for the portable computing device based at least in part on the second signal; and
      generate guidance instructions based at least in part on the parking location of the vehicle and the determined current location for the portable computing device.

2. The portable computing device of claim 1, wherein the portable computing device is configured to receive vehicle state information from a wireless transmitter in the vehicle, wherein the vehicle state information comprises:
   a current state of an engine of the vehicle;
   a position of the vehicle;
   an indication that the vehicle is currently parked; or
   a current state of a wireless connection between the portable computing device and the vehicle.

3. The portable computing device of claim 1, wherein the portable computing device is configured to:
   receive a parking system identifier; and
   execute, in response to receiving the parking system identifier, a vehicle location application on the portable computing device.

4. The portable computing device of claim 1, wherein the guidance instructions further comprise:
   a visual representation of the parking structure; or
   audio announcements.

5. The portable computing device of claim 1, wherein the guidance instructions are based at least in part on user preferences comprising:
   use of stairs;
   use of an elevator; or
   disability access.

6. The portable computing device of claim 1, wherein the portable computing device is configured to receive global positioning system (GPS) location information indicative of parking structure in response to the portable computing device being in proximity to the parking structure.

7. The portable computing device of claim 1, wherein the portable computing device is configured to determine that the vehicle is in a parked state based at least in part on:
   determining that the vehicle has been stationary for a period of time;
   determining that the vehicle is broadcasting a warning sound indicative of an open door; or
   determining that a Bluetooth connection between the vehicle and the portable computing device is terminated.

8. A method, comprising:
   transmitting, to a first wireless sensor of a parking system installed in proximity to for a parking structure, a request for location information, wherein the first wireless sensor is installed in a first fixed location in the parking structure;
   receiving a first signal from the first wireless sensor, wherein the first signal comprises the location information, wherein the location information is based on the first fixed location of the first wireless sensor;

storing an indication of a parking location of a vehicle based at least in part on the location information;

receiving a second signal from a second wireless sensor of the parking system, wherein the second wireless sensor is installed in a second fixed location in the parking structure that is different from the first fixed location;

determining a current location for a portable computing device based at least in part on the second signal; and generating guidance instructions based at least in part on the parking location of the vehicle and the determined current location for the portable computing device.

9. The method of claim 8, further comprising:
receiving vehicle state information from a wireless transmitter in the vehicle, wherein the vehicle state information comprises:
a current state of an engine of the vehicle;
a position of the vehicle;
an indication that the vehicle is currently parked; or
a current state of a wireless connection between the portable computing device and the vehicle.

10. The method of claim 8, further comprising:
receiving a parking system identifier; and
executing, in response to receiving the parking system identifier, a vehicle location application on the portable computing device.

11. The method of claim 8, wherein the guidance instructions further comprise:
a visual representation of the parking structure; or
audio announcements.

12. The method of claim 8, wherein the guidance instructions are based at least in part on user preferences comprising:
use of stairs;
use of an elevator; or
disability access.

13. The method of claim 8, further comprising:
receiving global positioning system (GPS) location information indicative of the parking structure in response to the portable computing device being in proximity to the parking structure.

14. The method of claim 8, further comprising:
determining that the vehicle is in a parked state based at least in part on:
determining that the vehicle has been stationary for a period of time;
determining that the vehicle is broadcasting a warning sound indicative of an open door; or
determining that a Bluetooth connection between the vehicle and the portable computing device is terminated.

15. A non-transitory, computer-readable storage medium storing instructions that, when executed by one or more processors, cause the one or more processors to:
transmit, to a first wireless sensor of a parking system for a parking structure, a request for location information, wherein the first wireless sensor is installed in a first fixed location in the parking structure;
receive a first signal from the first wireless sensor, wherein the first signal comprises the location information, wherein the location information is based on the first fixed location of the first wireless sensor;
store an indication of a parking location of a vehicle based at least in part on the location information;
receive a second signal from a second wireless sensor of the parking system, wherein the second wireless sensor is installed in a second fixed location in the parking structure that is different from the first fixed location;
determine a current location for a portable computing device based at least in part on the second signal; and
generate guidance instructions based at least in part on the parking location of the vehicle and the determined current location for the portable computing device.

16. The non-transitory, computer-readable storage medium of claim 15, further comprising instructions that cause the one or more processors to:
receive vehicle state information from a wireless transmitter in the vehicle, wherein the vehicle state information comprises:
a current state of an engine of the vehicle;
a position of the vehicle;
an indication that the vehicle is currently parked; or
a current state of a wireless connection between the portable computing device and the vehicle.

17. The non-transitory, computer-readable storage medium of claim 15, further comprising instructions that cause the one or more processors to:
receive a parking system identifier; and
execute, in response to receiving the parking system identifier, a vehicle location application on the portable computing device.

18. The non-transitory, computer-readable storage medium of claim 15, wherein the guidance instructions further comprise:
a visual representation of the parking structure; or
audio announcements.

19. The non-transitory, computer-readable storage medium of claim 15, further comprising instructions that cause the one or more processors to:
receive global positioning system (GPS) location information indicative of the parking structure in response to the portable computing device being in proximity to the parking structure.

20. The non-transitory, computer-readable storage medium of claim 15, further comprising instructions that cause the one or more processors to:
determine that the vehicle is in a parked state based at least in part on:
determine that the vehicle has been stationary for a period of time;
determine that the vehicle is broadcasting a warning sound indicative of an open door; or
determine that a Bluetooth connection between the vehicle and the portable computing device is terminated.

* * * * *